United States Patent
Lacey

(10) Patent No.: US 12,469,202 B2
(45) Date of Patent: *Nov. 11, 2025

(54) ORDERING OF PATCH SELECTION IN TESSELLATION OPERATIONS

(71) Applicant: Imagination Technologies Limited, Kings Langley (GB)

(72) Inventor: Peter Malcolm Lacey, Buckinghamshire (GB)

(73) Assignee: Imagination Technologies Limited, Kings Langley (GB)

( * ) Notice: Subject to any disclaimer, the term of this patent is extended or adjusted under 35 U.S.C. 154(b) by 0 days.

This patent is subject to a terminal disclaimer.

(21) Appl. No.: 18/601,817

(22) Filed: Mar. 11, 2024

(65) Prior Publication Data

US 2024/0221278 A1    Jul. 4, 2024

Related U.S. Application Data

(63) Continuation of application No. 17/881,757, filed on Aug. 5, 2022, now Pat. No. 11,928,768, which is a
(Continued)

(30) Foreign Application Priority Data

Apr. 5, 2018    (GB) ...................................... 1805698

(51) Int. Cl.
*G06T 15/00* (2011.01)
*G06T 17/20* (2006.01)

(52) U.S. Cl.
CPC ............ *G06T 15/005* (2013.01); *G06T 17/20* (2013.01); *G06T 17/205* (2013.01)

(58) Field of Classification Search
None
See application file for complete search history.

(56) References Cited

U.S. PATENT DOCUMENTS 5,995,109 A    11/1999    Goel et al.
6,100,894 A    8/2000    Goel
(Continued)

FOREIGN PATENT DOCUMENTS

| EP | 0663651 A1 | 7/1995 |
| GB | 2533443 A | 6/2016 |
| GB | 2539042 A | 12/2016 |

OTHER PUBLICATIONS

Fung "Towards Adaptive Rendering of Smooth Primitives on GPUs" Disseration, University of British Columbia 2005.
(Continued)

*Primary Examiner* — Ryan M Gray
(74) *Attorney, Agent, or Firm* — Potomac Law Group, PLLC; Vincent M DeLuca

(57) ABSTRACT

A method of controlling the order in which primitives, generated during tessellation, are output by the tessellation unit involves sub-dividing a patch, selecting one of the two sub-patches which are formed by the sub-division and tessellating that sub-patch until no further sub-division is possible before tessellating the other (non-selected) sub-patch. The method is recursively applied at each level of sub-division. Patches are output as primitives at the point in the method where they do not require any further sub-division. The selection of a sub-patch is made based on the values of one or more flags and any suitable tessellation method may be used to determine whether to sub-divide a patch. Methods of controlling the order in which vertices are output by the tessellation unit are also described and these may be used in combination with, or independently of, the method of controlling the primitive order.

20 Claims, 19 Drawing Sheets

Related U.S. Application Data continuation of application No. 17/138,415, filed on Dec. 30, 2020, now Pat. No. 11,468,622, which is a continuation of application No. 16/376,779, filed on Apr. 5, 2019, now Pat. No. 10,909,742.

(56) References Cited

U.S. PATENT DOCUMENTS

| | | | |
|---|---|---|---|
| 6,618,055 | B1 | 9/2003 | Tsuchida et al. |
| 8,471,852 | B1 | 6/2013 | Bunnell |
| 10,621,782 | B1 | 4/2020 | Rauwendaal |
| 10,909,742 | B2* | 2/2021 | Lacey ............ G06T 17/20 |
| 11,191,620 | B1 | 12/2021 | Raslambekov |
| 11,222,397 | B2 | 1/2022 | Saleh et al. |
| 11,468,622 | B2* | 10/2022 | Lacey ............ G06T 17/205 |
| 11,928,768 | B2* | 3/2024 | Lacey ............ G06T 17/20 |
| 2001/0013866 | A1 | 8/2001 | Migdal et al. |
| 2004/0113909 | A1 | 6/2004 | Fenney et al. |
| 2006/0050071 | A1 | 3/2006 | Fenney et al. |
| 2006/0242618 | A1* | 10/2006 | Wang ............ G03F 7/70441 716/52 |
| 2008/0273034 | A1 | 11/2008 | Fenney et al. |
| 2010/0164955 | A1* | 7/2010 | Sathe ............ G06T 17/20 345/423 |
| 2013/0162651 | A1* | 6/2013 | Martin ............ G06T 17/20 345/441 |
| 2014/0139525 | A1 | 5/2014 | Grenfell |
| 2014/0164655 | A1* | 6/2014 | Alfieri ............ G06F 5/10 710/57 |
| 2014/0168221 | A1 | 6/2014 | Fishwick |
| 2015/0042649 | A1* | 2/2015 | Kim ............ G06T 9/001 345/423 |
| 2018/0075650 | A1 | 3/2018 | Akenine-Moller et al. |
| 2018/0349315 | A1 | 12/2018 | Heggelund et al. |
| 2021/0405248 | A1 | 12/2021 | Cancelliere et al. |
| 2024/0323404 | A1* | 9/2024 | Smith-Lacey ....... H04N 19/176 |

OTHER PUBLICATIONS

Lai., "Near-Optimum Adaptive Tessellation of General Catmull-Clark Subdivision Surfaces," Advances in Computer Graphics Lecture Notes in Computer Science, 2006, pp. 562-569.

Schafer et al.; "State of the Art Report on Real-time Rendering with Hardware Tessellation," Eurographics State of the Art Reports, 2014.

Settgast et al., "Adaptive Tessellation of Subdivision Surfaces." Computer and Graphics, vol. 28, No. 1, 2004, pp. 73-78.

Tatarchuk, "Real-Time Tessellation on Gpu," SIGGRAPH2007.

* cited by examiner

ORDERING OF PATCH SELECTION IN TESSELLATION OPERATIONS

CROSS-REFERENCE TO RELATED APPLICATIONS AND CLAIM OF PRIORITY

This application is continuation under 35 U.S.C. 120 of application Ser. No. 17/881,757 filed Aug. 5, 2022, now U.S. Pat. No. 11,928,768, which is a continuation of prior application Ser. No. 17/138,415 filed Dec. 30, 2020, now U.S. Pat. No. 11,468,622, which is a continuation of prior application Ser. No. 16/376,779 filed Apr. 5, 2019, now U.S. Pat. No. 10,909,742, which claims foreign priority under 35 U.S.C. 119 from United Kingdom Application No. 1805698.6 filed Apr. 5, 2018, the contents of which are incorporated by reference herein in their entirety.

BACKGROUND

Tessellation is a technique used in computer graphics to divide up a set of surfaces representing objects in a scene into a number of smaller and simpler pieces, (referred to as primitives), typically triangles, which are more amenable to rendering. The resulting tessellated surface is generally an approximation to the original surface, but the accuracy of this approximation can be improved by increasing the number of generated primitives, which in turn usually results in the primitives being smaller. The amount of tessellation/sub-division is usually determined by a level of detail (LOD). An increased number of primitives is therefore typically used where a higher level of detail is required, e.g. because an object is closer to the viewer and/or the object has a more intricate shape. However, use of larger numbers of triangles increases the processing effort required to render the scene.

The sub-division into triangle primitives is typically performed on patches which are square or triangular in shape (i.e. a quad or a triangle) and which may be curved to fit to the surface of the object they represent (and hence may be referred to as 'surface patches') and/or have displacement mapping applied. The sub-division, however, is not performed on curved patches but is instead performed in the domain of the patch (e.g. as if the patch is planar rather than being defined by, for example, a polynomial equation) which may be defined in terms of (u,v) parameters and referred to as 'parametric space'. This means that the tessellation process is independent of any curvature present in the final surface.

Tessellation may be performed ahead of time (e.g. to compute a number of different views of a scene at different levels of detail and/or from different viewpoints) or may be performed on the fly (e.g. to provide continuous or view-dependent levels of detail). With some existing tessellation methods, a user can experience undesirable visual artefacts where, although the requested level of detail is changed smoothly, the resulting tessellation changes in a discontinuous fashion.

The embodiments described below are provided by way of example only and are not limiting of implementations which solve any or all of the disadvantages of known methods and apparatus for performing tessellation.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Described herein is a method of controlling the order in which primitives generated during tessellation are output by the tessellation unit. The method involves sub-dividing a patch, selecting one of the two sub-patches which are formed by the sub-division and tessellating that sub-patch until no further sub-division is possible before tessellating the other (non-selected) sub-patch. The method is recursively applied at each level of sub-division. Patches are output as primitives at the point in the method where they do not require any further sub-division. The selection of a sub-patch is made based on the values of one or more flags and any suitable tessellation method (e.g. any tessellation method involving binary sub-division) may be used to determine whether to sub-divide a patch. Methods of controlling the order in which vertices are output by the tessellation unit are also described and these may be used in combination with, or independently of, the method of controlling the primitive order.

A first aspect provides a method of performing tessellation in a computer graphics system, the method comprising: analysing an initial patch to determine whether to sub-divide the patch; in response to determining that the initial patch is to be sub-divided, dividing the initial patch into two or more sub-patches; and selecting and tessellating each sub-patch until there is no further sub-division of that sub-patch, wherein sub-patches are selected for tessellation in an order encoded by one or more stored values.

A second aspect provides a tessellation unit configured to perform tessellation in a graphics processing pipeline, wherein the tessellation unit comprises hardware logic arranged to: analyse an initial patch to determine whether to sub-divide the patch; in response to determining that the initial patch is to be sub-divided, divide the input patch into two or more sub-patches; and select and tessellate each sub-patch until there is no further sub-division of that sub-patch, wherein sub-patches are selected for tessellation in an order encoded by one or more stored values.

The tessellation unit configured to perform one of the ordering methods described herein (or a graphics pipeline comprising the tessellation unit) may be embodied in hardware on an integrated circuit. There may be provided a method of manufacturing, at an integrated circuit manufacturing system, a tessellation unit configured to perform one of the ordering methods described herein. There may be provided an integrated circuit definition dataset that, when processed in an integrated circuit manufacturing system, configures the system to manufacture a tessellation unit configured to perform one of the ordering methods described herein. There may be provided a non-transitory computer readable storage medium having stored thereon a computer readable description of an integrated circuit that, when processed, causes a layout processing system to generate a circuit layout description used in an integrated circuit manufacturing system to manufacture a tessellation unit configured to perform one of the ordering methods described herein.

There may be provided an integrated circuit manufacturing system comprising: a non-transitory computer readable storage medium having stored thereon a computer readable integrated circuit description that describes the tessellation unit configured to perform one of the ordering methods described herein; a layout processing system configured to process the integrated circuit description so as to generate a circuit layout description of an integrated circuit embodying the tessellation unit configured to perform one of the ordering methods described herein; and an integrated circuit generation system configured to manufacture the tessellation unit configured to perform one of the ordering methods described herein according to the circuit layout description.

There may be provided computer program code for performing a method as described herein. There may be provided non-transitory computer readable storage medium having stored thereon computer readable instructions that, when executed at a computer system, cause the computer system to perform the method as described herein.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which.

Figure 1:
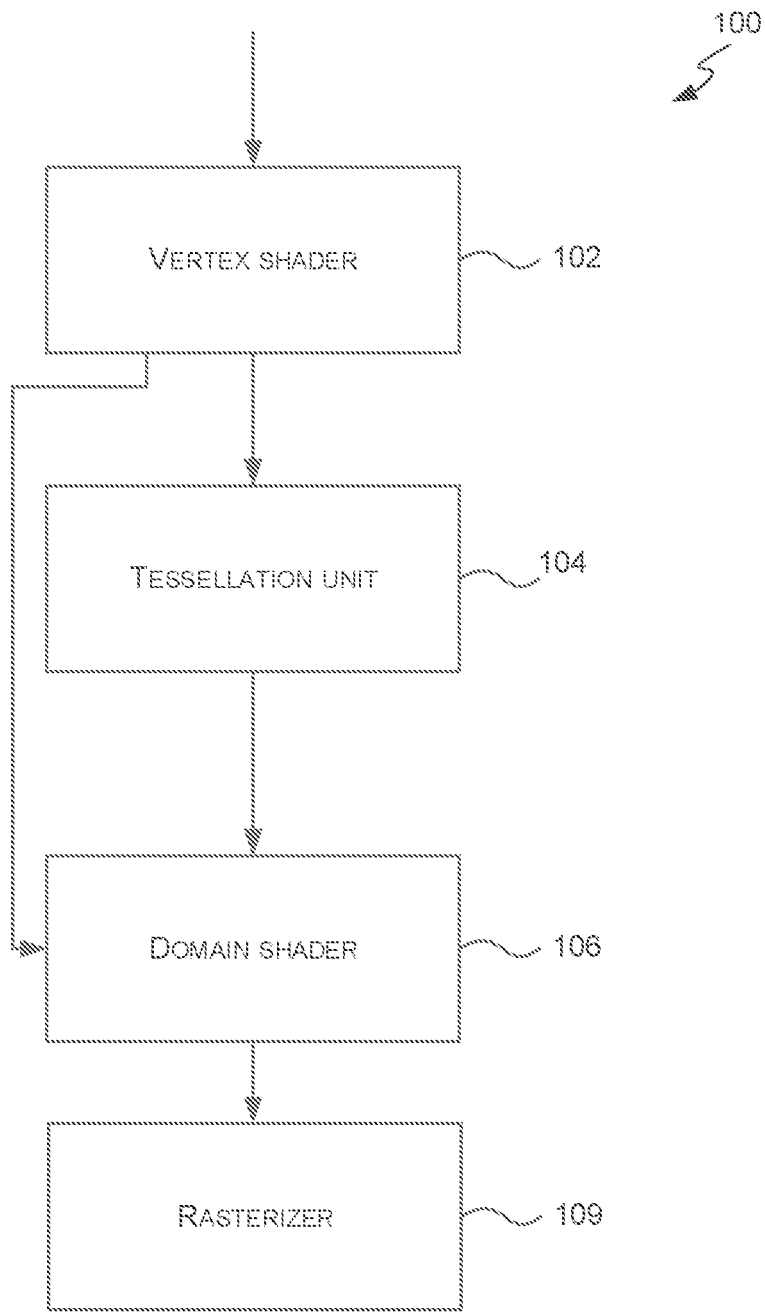
FIG. 1 is a schematic diagram of an example GPU pipeline.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art.

Embodiments will now be described by way of example only.

As described above, tessellation involves the selective sub-division of patches, which are typically square or triangular in shape, into smaller triangular patches. The determination as to whether a patch should be sub-divided or not is often made based on one or more tessellation factors (TFs), e.g. by comparing one or more TFs to each other and/or to a threshold value. In some examples edge tessellation factors are used, with each edge of a patch having an edge tessellation factor, and the edge tessellation factor defining how many times the particular edge (and hence the patch which it is part of) should be sub-divided. In other examples (such as in the methods described in GB2533443 and GB2533444) vertex tessellation factors are used, with each vertex (or corner) of a patch having a vertex tessellation factor.

The term 'surface patch' is used herein to refer to a, usually finite, N-dimensional surface (or in the case of an isoline, an N-dimensional curve segment) which is the result of applying a parametric mapping function to a bounded 2D domain, which is a quadrilateral, triangle or other polygon, (or in the case of an isoline, a 1D line segment). The resulting surface or isoline can be considered N-dimensional as it may include not only 3 (or 4) dimensions for Cartesian (or homogeneous) spatial positioning, but also other parameters such as texture coordinates. As described above, surface patches may be curved to fit to the surface of the object they represent and/or have displacement mapping applied. Tessellation (i.e. the sub-division of patches), however, is not performed in 'world space' (i.e. it is not performed on curved surface patches) but is instead performed in domain space (which may also be referred to as parametric space or parameter space or UV space) in which any position in the domain can be described by two coordinates (u, v) known as the domain space coordinates, which means that the tessellation process is independent of any curvature present in the final surface.

The term 'patch' is used herein to refer to an ordered set of two, three, four or more vertices (for an isoline, triangle, quad or polygon respectively) which bound a domain. The term 'domain' therefore refers to the two-dimensional space bounded by the vertices of a patch. The term 'input patch' is used to refer to a patch which is selected by a tessellation unit based on an input topology and again this input patch refers to an ordered set of vertices. In examples where the tessellation unit performs a pre-processing stage which sub-divides the input patch before repeatedly applying a tessellation algorithm to patches formed by the pre-processing stage, the patches formed in the pre-processing stage are referred to herein as 'initial patches'. Patches which are formed by the sub-division of initial patches are referred to herein as 'sub-patches'. The term 'primitive' is used herein to refer to a patch (e.g. an initial patch or sub-patch) that is output by the tessellation unit because it requires no further sub-division and whilst each primitive corresponds to a patch (i.e. an initial patch or sub-patch) it may be in a different form from the patch (e.g. a primitive may comprise indices rather than an ordered set of vertices). Whilst input patches, initial patches and sub-patches are often triangles and the examples below show triangles, in other examples, the input patches, initial patches and/or sub-patches may be isolines or any form of polygon.

The term 'vertex' is used generally to describe a location plus other attributes, where these attributes differ depending upon the context. For example, input control points and output vertices from a domain shader comprise a 3D position plus other parameters such as the normal, tangent, texture, etc. (and may be referred to as 'world space vertices'), whereas the vertices within the tessellator (i.e. those used within the tessellation method as elements of a patch) comprise a domain space coordinate and a vertex tessellation factor (and may be referred to as 'tessellator vertices'). These vertices within the tessellator are therefore not the same as the input control points or the resulting N-dimensional vertices that form the final triangles.

Described herein is a tessellation method that controls the order in which primitives are output by a tessellation unit (or tessellator). This method alternates the order that new patches (e.g. initial patches or sub-patches) are processed for each level of sub-division within the tessellation unit and as a consequence of this, contiguous primitives in the ordering (i.e. in the order that they are output) are guaranteed to be neighbouring primitives in UV space and thus share two vertices. This improves coherency (and hence efficiency) when caching recently used vertices for a domain shader (which may follow the tessellation unit, as shown in FIG. 1) and also improves compression of primitives/vertices. Use of the improved output ordering for primitives, as described herein, also makes the primitives more coherent in world space (as a consequence of the increased coherency in UV space) and this improves rasterization efficiency (e.g. texel cache look-ups).

Also described herein are tessellation methods that control the order in which vertices are output. These tessellation methods that control the order in which vertices are output may be used in combination with the method that controls the order in which primitives are output or may be used independently of that primitive ordering method.

By controlling both the output order of primitives and the output order of vertices, the coherency (and hence efficiency) when caching recently used vertices for a domain shader is improved. In particular, parent vertices are brought closer (in the ordering) to their child vertices and this reduces the likelihood that the parent vertices will have been removed from the cache prior to reuse. Additionally, because the vertices are more coherent in UV space, they are more coherent to the primitive ordering and this may improve final primitive assembly before rasterisation.

The methods described herein may be implemented in hardware. In various examples, the methods may be implemented in a tessellation unit 104 within a graphics processing unit (GPU) as shown in FIG. 1. The tessellation unit 104 may be implemented in hardware for example using fixed-function circuitry (and hence may be referred to as a 'hardware tessellation unit'), in software, or in a combination of hardware and software.

FIG. 1 shows a schematic diagram of an example GPU pipeline 100 which may be implemented in hardware within a GPU. As shown in FIG. 1, the pipeline 100 comprises the tessellation unit 104 and a vertex shader 102 which is responsible for performing per-vertex calculations, a domain shader 106 and a rasterizer 109. The vertex shader 102 has no knowledge of the mesh topology and only knows the current vertex that has been fed into it. Between the vertex shader 102 and the tessellation unit (or tessellator) 104 there may be one or more optional hull shaders, not shown in FIG. 1. The GPU pipeline 100 may also comprise other elements, not shown in FIG. 1, such as a geometry specific domain shader and/or a tiling unit. A geometry specific (or geometry only) domain shader, is a shader that generates the world space coordinate of an input domain vertex but need not generate any other world space attribute.

The tessellation unit (or tessellator) 104 (when implemented in hardware) comprises hardware logic to implement the ordering methods described herein (e.g. as shown in any of FIGS. 2, 7, 8, 10, 12 and 13). Unlike the vertex shader, the tessellation unit (and any optional hull Shaders) operates per input patch and not per-vertex. The tessellation unit 104 outputs primitives and the output primitive takes the form of three vertex indices and a buffer of vertex data (e.g. for each vertex, a UV coordinate and in various examples, other parameters such as a displacement factor and optionally parent UV coordinates). Where indexing is not used, an output primitive takes the form of three domain vertices, where a domain vertex may comprise only a UV coordinate or may comprise a UV coordinate plus other parameters (e.g. a weight, such as a displacement factor, and optionally, parent UV coordinates). The data output by the tessellation unit 104 may be passed onto the domain shader 106 (e.g. control points) or to a further geometry specific domain shader not shown in FIG. 1 (e.g. where tiling is used) either directly or via a memory (not shown in FIG. 1). For example, the tessellation unit 104 may store, in a buffer which is accessible by the domain shader 106 or geometry specific domain shader, the tessellation factors of the surface patch.

The domain shader 106 acts as a second vertex shader for vertices produced by the tessellator 104 and is executed once per vertex per primitive per tile, although caching may be used to enable reuse of shared vertices. The domain shader is supplied with a domain space location (u,v) and is given all patch information and outputs a full vertex structure. The domain shader uses the patch control points and the domain space coordinates to build the new vertices and applies any displacement mapping (e.g. by sampling a height map encoded in a texture). The domain shading (in the domain shader 106) may be left as late as possible in the GPU pipeline 100 because it greatly enlarges vertex sizes (e.g. in terms of the number of bits of data for each vertex).

After the domain shader 106 has run for each generated vertex of each patch, the vertices are passed on to the rasterizer 109 and some or all of the primitives are rendered. In tandem, primitives (in the form of index buffers) are passed from the tessellator to the rasterizer. Alternatively, if no indexing is used, primitives for rasterisation are given by consecutive triples of vertices output from the Domain Shader. In this scenario no final triangle primitive assembly is required.

The GPU pipeline 100 of FIG. 1 is shown by way of example only and the improved tessellation methods described herein may be used in any GPU architecture. It will also be appreciated that the tessellation unit 104 may be used in a GPU pipeline which comprises other shaders in addition to, or instead of, a vertex shader 102, an optional hull shader and a domain shader 106.

The ordering methods described herein may alternatively be implemented in software (or a combination of software and hardware) and an example computing-based device which may be configured to implement the tessellation methods described above is described below with reference to FIG. 17.

Figure 2A:
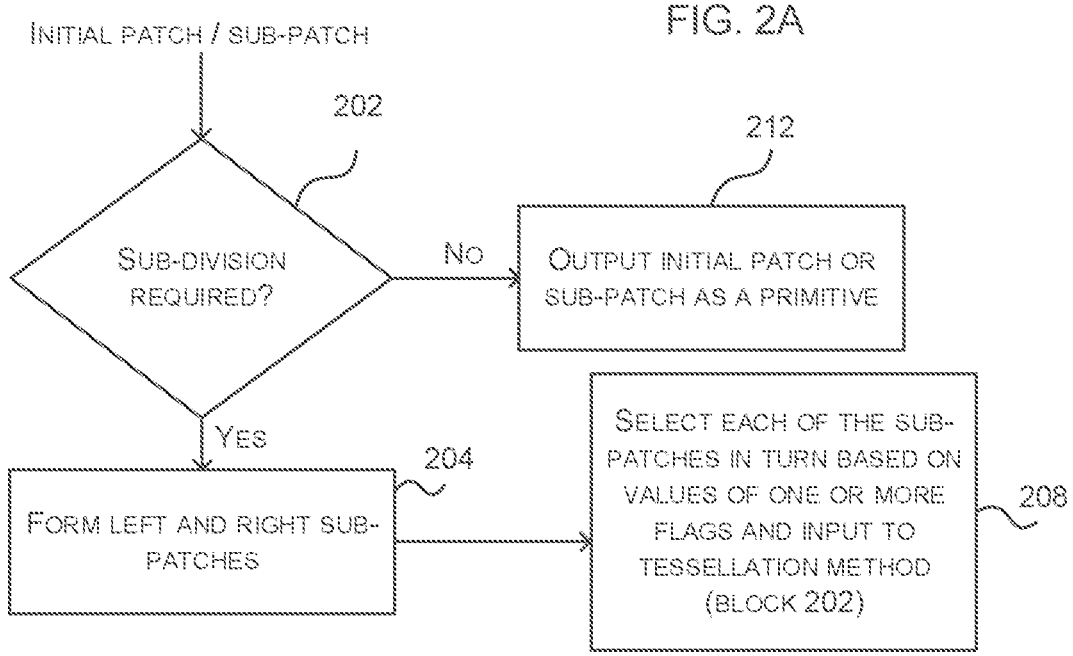
FIG. 2A is a flow diagram showing an example tessellation method that controls the order of primitive generation.

FIG. 2A is a flow diagram showing an example tessellation method that controls the order in which primitives are output by the tessellation unit and this method may be described with reference to the example patches shown in FIGS. 3A-3E. As described above, the method alternates the order that new patches are processed for each level of sub-division within the tessellation unit and as a consequence of this, adjacent primitives in the output ordering are guaranteed to be neighbouring primitives in UV space and thus share two vertices.

Figure 3A:
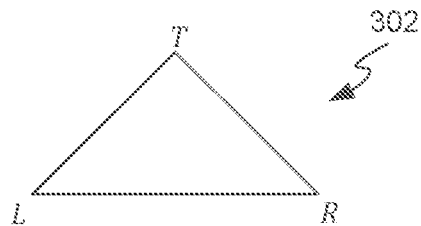
FIG. 3A-3E shows schematic diagrams illustrating the method of FIG. 2A.

The method shown in FIG. 2A takes as an input, an initial patch (which may, in various examples, be an initial triangle patch) and FIG. 3A shows an example triangle initial patch 302. As described above, a triangle patch is an ordered set of three vertices which bound a domain and in the examples described herein, this ordered set of vertices is written (T, L, R), where T, L and R refer to the top, left and right vertices respectively (as shown in FIG. 3A).

As shown in FIG. 2A, an assessment is made to determine whether sub-division of the initial patch 302 is required (block 202). This determination may be made using any suitable tessellation method (e.g. any tessellation method that involves binary sub-division) and two examples which use vertex tessellation factors are described in GB2533443 and GB2533444. The method described in GB2533443 is shown, by way of example, in FIGS. 15 and 16 and described below.

Figure 3B:
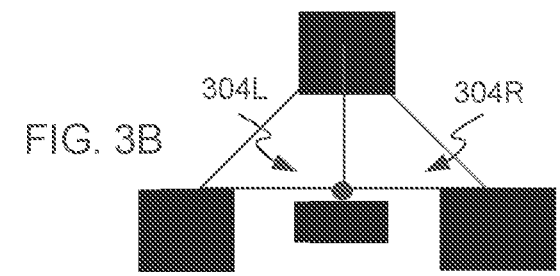
Figure 3C:
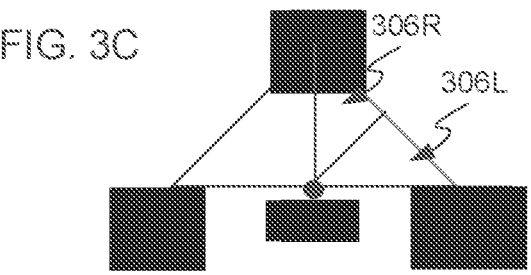

If it is determined that the initial patch needs to be sub-divided ('Yes' in block 202), then left and right sub-patches are formed (block 204). This sub-division of the initial patch 302 may comprise adding a mid-vertex (denoted M) on the edge between the left and right vertices (as shown in FIG. 3B) and in various examples the mid-vertex may be added at the mid-point between the left and right vertices. Both of these patches 304L, 304R which are formed (in block 204) are triangle patches and comprise an ordered set of three vertices: (M, R, T) and (M, T, L), but in other examples they may be isolines or have more than three sides, and they may be referred to as the right sub-patch 304R and the left sub-patch 304L respectively.

One of the newly formed sub-patches (i.e. the left sub-patch 304L or the right sub-patch 304R formed in block 204) is then selected (in block 208) to be further tessellated ahead of the other of the newly formed sub-patches by inputting the selected sub-patch back into the method of FIG. 2A. The order of selection of the left or right sub-patch (in block 208) is made based on the values of one or more flags and two different examples of the use of flags are described below. In this way, the method of FIG. 2A is applied recursively at each level of sub-division of an initial patch with one branch of the sub-division tree being sub-divided fully, before assessing the other branch of the sub-division tree and with the order of selection at each branching point being determined by the one or more flags.

In a first example, there is a flag (e.g. a single bit flag) for each patch (e.g. for each initial patch and for each sub-patch which is subsequently formed by tessellation). This per-patch flag determines whether the left sub-patch or the right sub-patch is selected first and input back into the method of FIG. 2A (in block 208) when that patch is sub-divided, i.e. when sub-dividing the initial patch (in block 204), it is the flag associated with the initial patch that determines the selection made in the subsequent step (in block 208). In such an example, this makes a triangle patch an ordered set of three vertices and a flag, e.g. (T, L, R, F) or (T, L, R, F̄) where F and F̄ represent the two different flag values (e.g. off and on, 1 and 0).

If the flag of the initial patch 302 (which is being sub-divided in block 204 as a consequence of the assessment in block 202) has a first value of the flag (e.g. F) then the right sub-patch is selected and processed first (in block 208) and the left sub-patch is input back into the method of FIG. 2A (i.e. tessellated as needed) only when no further sub-division of the right sub-patch is possible. If, however, the flag of the input patch 302 has the other value (e.g. F̄) then the left sub-patch is selected and processed first (in block 208) and the right sub-patch is input back into the method of FIG. 2A (i.e. tessellated as needed) only when no further sub-division of the left sub-patch is possible. In such an example, when two sub-patches are generated by sub-division of a parent patch (in block 204, where the parent patch may be the initial patch or a sub-patch formed from the initial patch), the value of the flag for both of the newly formed sub-patches is set to have the opposite value to the parent patch. Consequently, if the initial patch is (T, L, R, F) then the two sub-patches which are formed (in block 204) are (M, T, L, F̄) and (M, R, T, F̄). Similarly, if the initial patch is (T, L, R, F̄) then the two sub-patches which are formed (in block 204) are (M, T, L F) and (M, R, T, F).

In a second example, a single flag may be used in the tessellator which switches state every time the level of recursion decreases or increases by one. In this second example if the single flag has a first value (e.g. F) then the right sub-patch is selected and input back into the method of FIG. 2A first (in block 208) and the left sub-patch is input back into the method of FIG. 2A (i.e. tessellated as needed) only when no further sub-division of the right sub-patch is possible. If, however, the single flag has the other value (e.g. F̄) then the left sub-patch is selected and input back into the method of FIG. 2A first (in block 208) and the right sub-patch is input back into the method of FIG. 2A (i.e. tessellated as needed) only when no further sub-division of the left sub-patch is possible. In this example, the swapping of the flag value may, for example, be performed following the decision to sub-divide (e.g. in response to a 'Yes' in block 202) or following the formation of the two sub-patches (in block 204).

As described above, having selected one of the two newly formed sub-patches 304R, 304L (in block 208), the selected sub-patch is input back into the method of FIG. 2A and tessellated until no further sub-division is possible (in block 208) and this is a recursive process. The selected newly formed sub-patch (e.g. sub-patch 304R) becomes an input to the method of FIG. 2A and it is determined whether that patch should be sub-divided (in block 202).

If no sub-division is required ('No' in block 202), the selected newly formed sub-patch is output as a primitive (block 212) and the non-selected newly formed sub-patch (e.g. patch 304L) is input to the method of FIG. 2A.

If, however, sub-division of the selected sub-patch (e.g. 304R) is required ('Yes' in block 202), left and right sub-patches (306L, 306R) are formed from the selected sub-patch (in block 204). As the flags at this level of recursion have been swapped (either as a consequence of the flag in sub-patch 304R being opposite to that in initial patch 302 or because the single flag was swapped as part of the method of generating the sub-patches 304R, 304L), instead of selecting the right sub-patch 306R first (as was the case at the immediately preceding level of recursion which resulted in the selection of sub-patch 304R), the left sub-patch 306L is selected first (in block 208). If this selected sub-patch 306L does not require any sub-division, it is output as a primitive (in block 212) and the non-selected sub-patch 306R is selected and assessed (in block 202). Only when tessellation of both of these sub-patches 306L, 306R is complete, is the non-selected sub-patch 304L from the top level of tessellation input back into the method of FIG. 2A and considered for sub-division (in block 202).

The output primitive (from block 212) takes the form of three indices in systems which use vertex indexing and three domain vertices where indexing is not used and where, as detailed above, a domain vertex may comprise only a UV coordinate or may comprise a UV coordinate plus other parameters (e.g. a weight and optionally the UV coordinates of one or more neighbouring vertices). In particular this weight may be a displacement factor and these neighbouring vertices may be two or three parent vertices as described in GB2533443 and GB2533444.

Figure 3D:
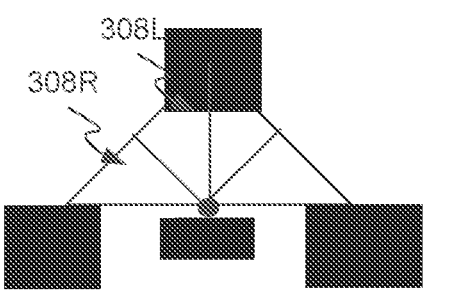

As shown in FIG. 3D, if the non-selected sub-patch 304L requires sub-division ('Yes' in block 202), two new sub-patches are formed, 308L, 308R. The flag used to make the selection (in block 208) has the same value when making a selection between patches 308L and 308R as it did when making a selection between sub-patches 306L and 306R because both sub-divisions occur at the same level of recursion/tessellation and hence the left sub-patch 308L is selected first. If this selected sub-patch 308L does not require any sub-division, it is output as a triangle primitive (in block 212) and the non-selected sub-patch 308R is input to the method of FIG. 2A and assessed (in block 202).

Figure 3E:
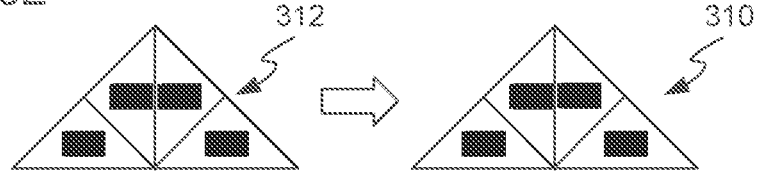

If using the method shown in FIG. 2A, the initial patch 302 is sub-divided into four sub-patches 306L, 306R, 308L, 308R, the sub-patches are generated and their primitives output in the following order: 306L, 306R, 308L, 308R and this ordering (with output primitives labelled 0-3 in order on the tessellated initial patch 310) is shown in FIG. 3E.

Figure 2B:
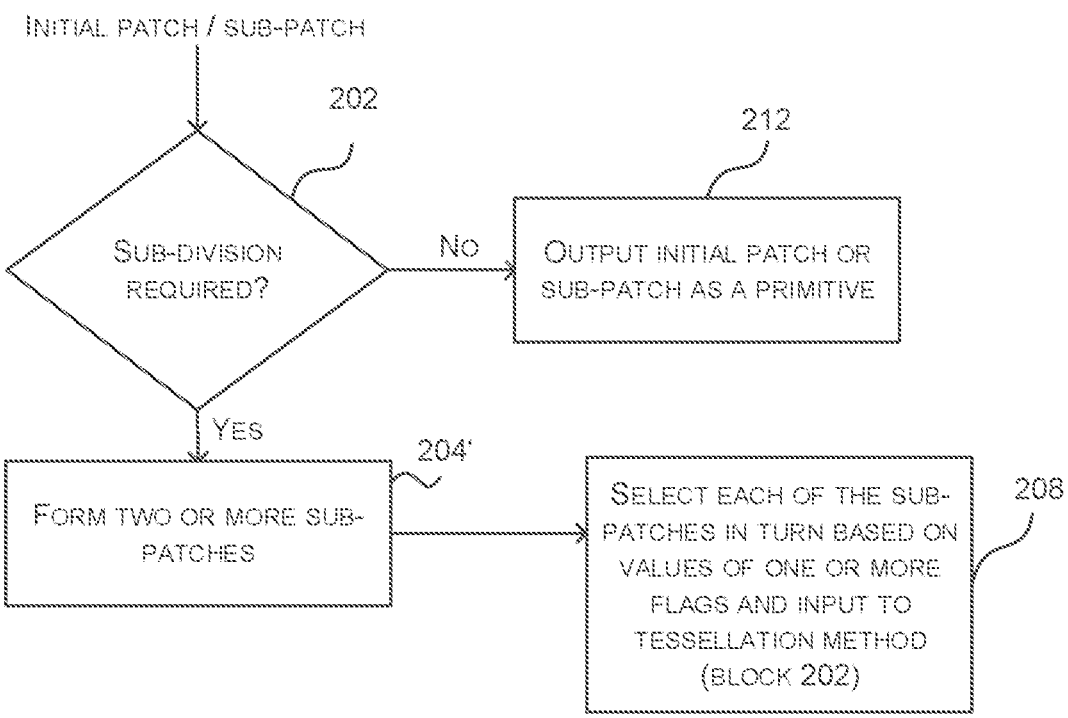
FIG. 2B is a flow diagram showing a variation on the example tessellation method shown in FIG. 2A.

Whilst the method of FIG. 2A involves use of a tessellation method that performs binary sub-division, the methods described herein may also be used where a patch is sub-divided into more than two sub-patches (e.g. into four sub-patches or X sub-patches, where X may often be a power of 2). FIG. 2B shows a further method of tessellation which is variant of the method shown in FIG. 2A (described above).

In the method shown in FIG. 2B, if sub-division is required ('Yes' in block 202), the initial patch, or a sub-patch in subsequent levels of recursion, is sub-divided into two or more sub-patches (block 204', e.g. into X sub-patches). Each of the sub-patches is then selected in turn, with the order of selection being based on the values of one or more flags (block 208) to be fed back into the method of FIG. 2B and tessellated until there is no further sub-division.

The order in which sub-patches are selected (in block 208) is based on the values of more than one flag. More generally, the values of the one or more flags may be considered to encode an ordering for the tessellation of the sub-patches formed from the input patch (in block 204') and each sub-patch may be tessellated in turn (by inputting the sub-patch into the method of FIG. 2B) until there is no further sub-division based on the ordering encoded by the values of the one or more flags.

As described above with reference to FIG. 2A, each initial patch (and sub-patch once formed) may have an associated flag and the values of these flags may be used when selecting a sub-patch (in block 208). In examples where each sub-patch does not have an associated flag (as in the second flag example described above) and where the input patch is sub-divided into X sub-patches, the one or more flags may comprise a small stack of integers (with an entry for each level of recursion) that stores the number of sub-patches formed at each subdivision level, e.g. the value of X for the particular sub-division level where this value may be different for different levels.

If a new subdivision of a patch (e.g. an initial patch or a sub-patch) into X-sub-patches occurs, the value X is pushed onto the stack. Each time a subdivision does not occur the topmost value on the stack is decremented by 1. If the topmost value on the stack reaches zero it is popped off the stack. The subdivision level is then given by the number of elements of the stack, and the order of sub-patch selection (in block 208) may be determined as a function of this level.

In an alternative scheme, if a new subdivision of a patch into X sub-patches occurs, the value X−1 is pushed onto the stack. Each time subdivision of a patch/sub-patch does not occur, and a primitive is output, the topmost value on the stack is decremented by 1, unless this value is 0 in which case it is popped off the stack. If when popping a value off the stack the next one is also 0, it too is popped off the stack. The process terminates when the stack is empty. The subdivision level is then derived from the number of elements of the stack, and the order of sub-patch selection (in block 208) may be determined as a function of this level. This alternative scheme only has X possible values per entry, rather than X+1 as in the case of the previous scheme, meaning each entry may be encoded in fewer bits.

Using the method of FIG. 2B and where X is a power of 2, two or more levels of sub-division from the method of FIG. 2A may, for example, be performed in one sub-division step (e.g. in one batch before the next patch selection occurs).

Figure 4:
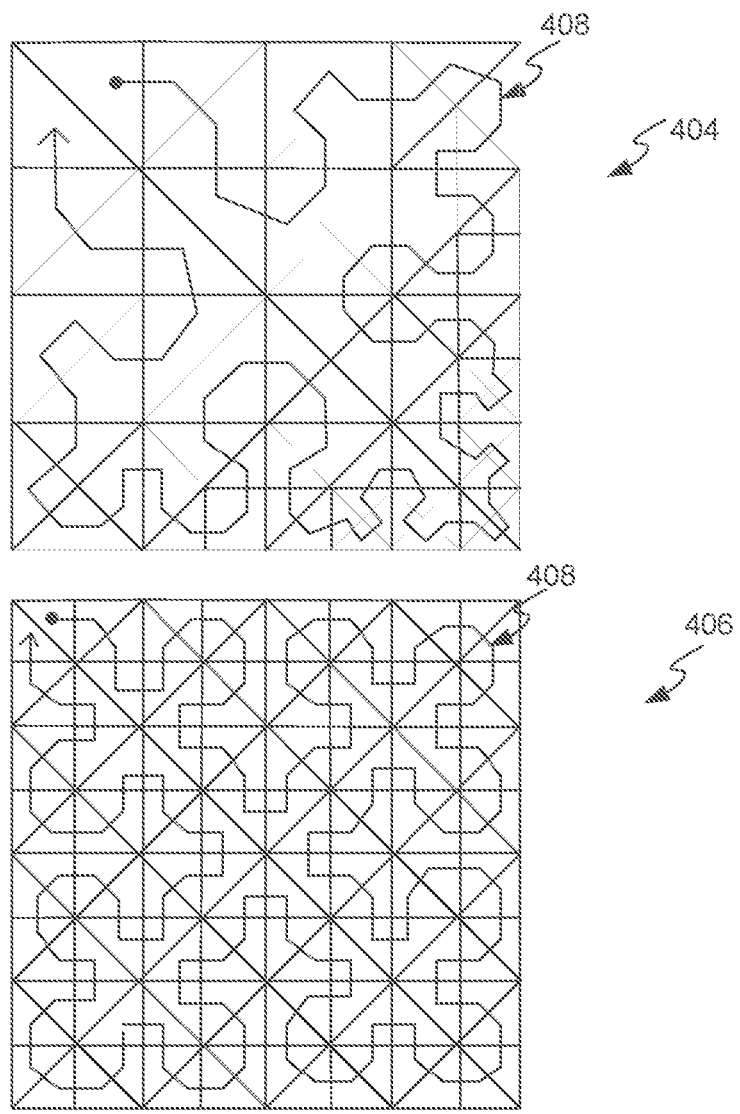
FIG. 4 shows examples of an improved ordering of primitives generated by tessellation.

Two further examples of the ordering of primitives when output which is achieved using the method of FIG. 2A are shown in FIG. 4. In these examples, the input patches are square and a preprocessing operation has been performed to subdivide the quad domain into four initial triangle patches (e.g. as shown in FIG. 14B) and these initial patches have been processed (as described above) in a clockwise order starting from the top initial patch. In other examples the initial patches may be processed in a counter-clockwise order starting from any initial patch. The examples 404, 406 show input quad patches with vertex TFs, in log base 2, of (1.5,2.5,3.5,2.5) and (3,3,3,3) respectively tessellated using the method of FIG. 2A in combination with a tessellation method such as the one described in GB2533443. In all the examples in FIG. 4 the ordering is indicated by a line 408 (starting with the black circle and ending with the arrowhead) passing through the patches in the order in which they are processed and output, as primitives, by the tessellator.

By using the method of FIG. 2A or 2B, adjacent primitives in the ordering also neighbour in UV space and thus share two vertices. This results in a change in the order in which vertices are output and improves coherency when caching recently used vertices for the domain shader (e.g. the domain shader 106 or a geometry specific domain shader). Use of the method of FIG. 2A or 2B also makes the primitives more coherent in world space (as a consequence of the increased coherency in UV space) and this improves rasterization efficiency (e.g. texel cache look-ups).

As described above, whilst the methods of FIGS. 2A and 2B initially determine whether to sub-divide an initial patch, the sub-patches formed in that tessellation operation and subsequent tessellation operations are then input to the method to determine whether they should be further sub-divided (i.e. at a lower level of tessellation). A patch that is sub-divided into two sub-patches may be referred to as a parent patch for those two sub-patches and the sub-patches may be referred to as child patches. As described above, the child patches may become parent patches in subsequent lower level tessellation operations.

The ordering which is produced using the method of FIGS. 2A and 2B (and as shown in FIGS. 3 and 4) may be referred to herein as 'improved ordering'. FIG. 3E shows a comparison of the improved ordering (tessellated patch 310) to a known ordering scheme which may be referred to as 'basic ordering' (tessellated patch 312). With the primitives in their improved order, the order of the vertices which are output is also modified, because the order of the vertices is, at least in part, inextricably linked to the primitive ordering.

Figure 6:
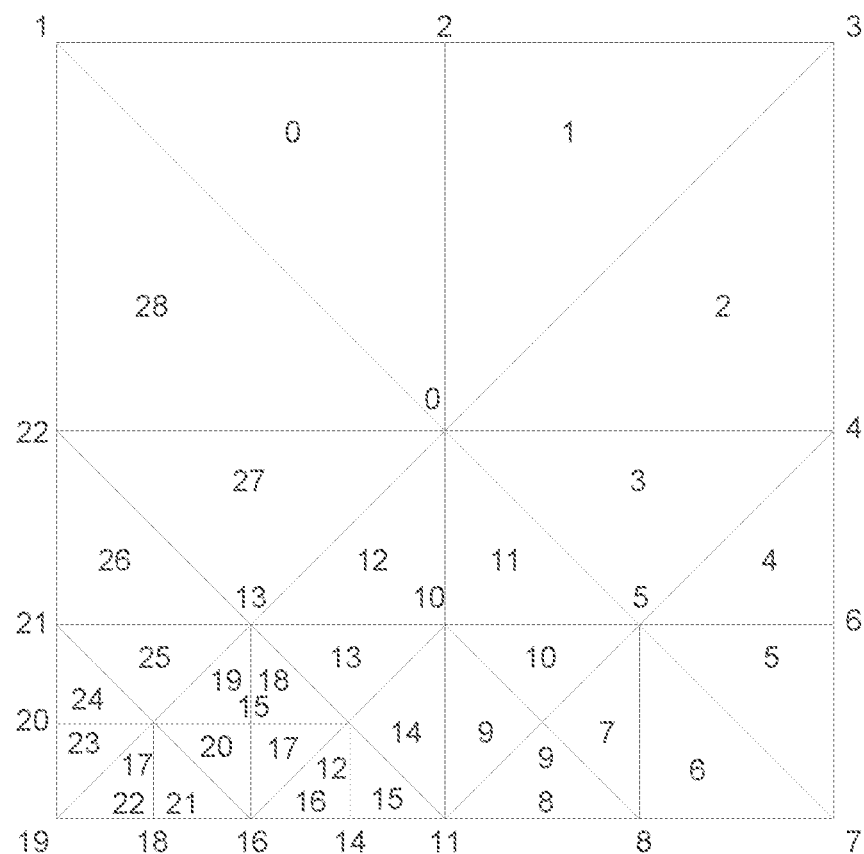
FIG. 6 shows an example ordering in which both the vertices and the primitives are numbered in order.
Figure 9:
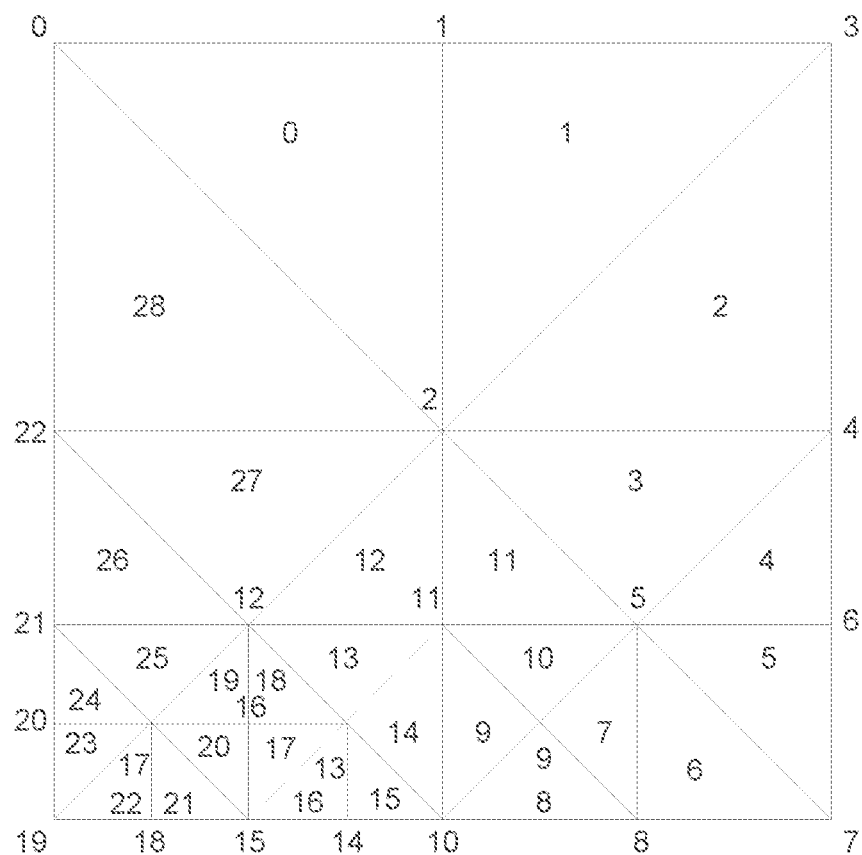
FIG. 9 shows a further example ordering in which both the vertices and the primitives are numbered in order.

Also described herein are two different methods of tessellation that control the order in which vertices are output and, as described above, these methods may be used in combination with the methods of FIGS. 2A and 2B or independently of those methods. The two different vertex output orders may be referred to as improved ordering of vertices (as shown in FIG. 6) and triangle strip ordering of vertices (as shown in FIG. 9). As described above, using the vertex ordering schemes described herein, the caching of domain shader results is improved because, as parent and child vertices are closer together within the ordering, the likelihood that parent vertices are removed from the cache prior to their reuse is reduced. This caching is further improved where both the improved vertex ordering and improved primitive ordering are used together.

Figure 5:
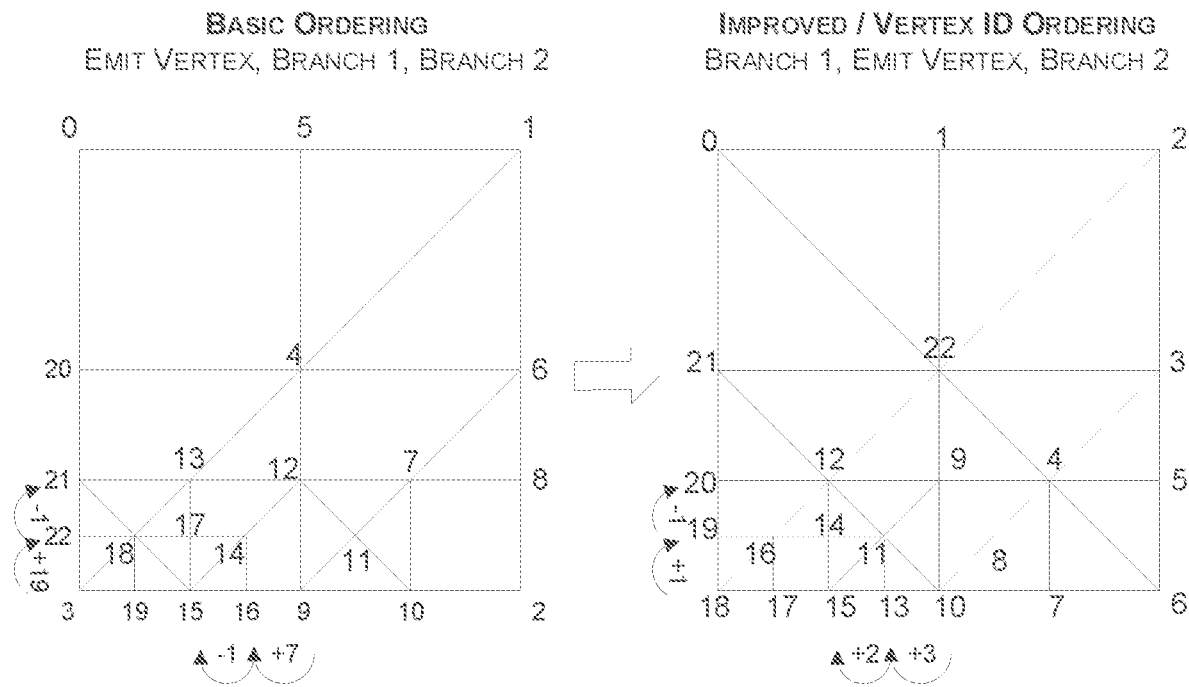
FIG. 5 shows schematic diagrams which provide a visual comparison between a known ordering scheme and the improved ordering scheme for primitives described herein.

The closeness of parent and child vertices, compared to known vertex ordering schemes, is shown in FIG. 5. FIG. 5 shows a comparison between a known ordering scheme and the improved ordering scheme described herein. The arrows between adjacent vertices indicate the proximity of the two vertices within the output order and it can be seen that in the known ordering scheme (referred to as "Basic Ordering" in FIG. 5), the separation can be large (e.g. 19 places in one of the examples shown in FIG. 5). In contrast the separation in the output order between spatially adjacent vertices resulting from the improved ordering scheme (referred to as "Improved/Vertex ID Ordering" in FIG. 5) and also from the triangle strip ordering scheme (not shown in FIG. 5) is much smaller and it is possible to specify an upper bound for this separation.

The generation of vertices according to the improved ordering scheme can be described with reference to FIGS. 6-8. FIG. 6 shows a further example ordering in which both the vertices and the primitives are numbered in order and FIG. 7 is a flow diagram showing an example method of ordering the vertices.

To generate vertices according to the improved ordering shown in FIG. 6, a stack (or other equivalent data structure) is used to hold vertices which have been generated (e.g. by sub-division in the method of FIGS. 2A and 2B) prior to their output. As shown in FIG. 7, when sub-division of a patch (e.g. an initial patch or a sub-patch) occurs ('Yes' in block 708, e.g. as in block 204 of FIG. 2A or 2B) and a new vertex is formed (e.g. M as shown in FIG. 3B), the new vertex is pushed onto the stack (block 710). When a sub-patch is reached where no sub-division is made ('No' in block 708, e.g. 'No' in block 202 of FIG. 2A or 2B, which may be part of a recursion in block 208 of FIG. 2A or 2B), then a vertex is popped off the stack (block 712) and the vertex is output if the vertex is new (block 714). This means that whilst a vertex may be added to the stack more than once (because it defines more than one patch), each vertex is only output once.

The example shown in FIG. 6 relates to a quad patch where a pre-processing step (block 701) has been performed to subdivide the quad domain into four initial triangle patches and these initial patches have been processed (blocks 708-714) in a clockwise order starting from the top initial patch. In other examples the initial patches may be processed in a counter-clockwise order starting from any initial patch. To initialize the method and the stack after the pre-processing operation (in block 701), as shown in FIG. 7, the middle and top left vertices of the quad patch are output initially (block 702) and then the other corners of the quad patch are pushed to the stack in reverse order (block 706 e.g. bottom left, bottom right then top right) whereby if the initial triangle patches formed by pre-processing the domain are processed in clockwise order this reverse order of the corner vertices is a counter-clockwise one, and if the initial triangle patches are processed in counter-clockwise order this reverse order is a clockwise one. In other examples the vertex corner output first (in block 702) may be any other corner vertex.

Figure 7:
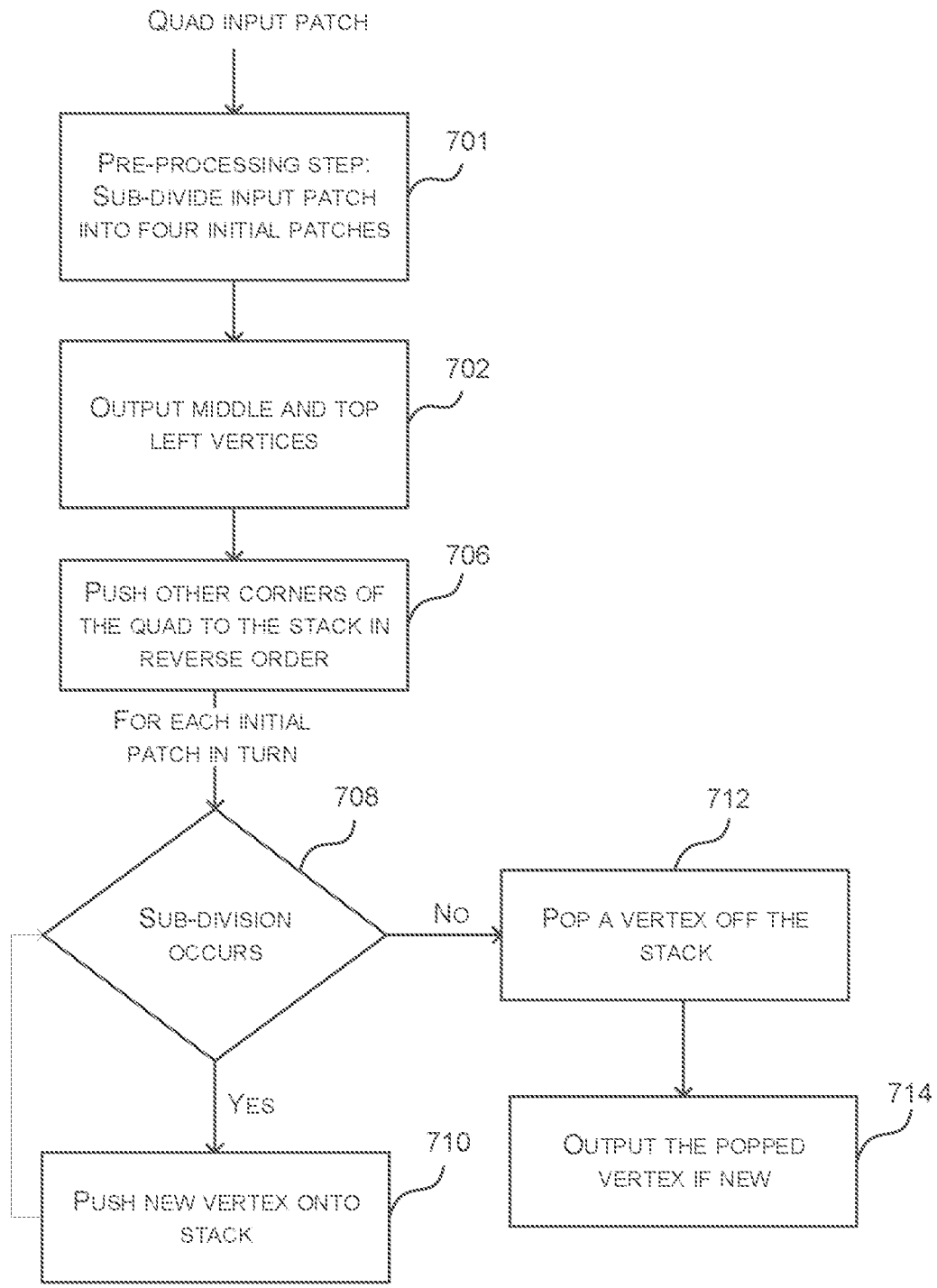
FIG. 7 is a flow diagram showing an example method of ordering the vertices.
Figure 8:
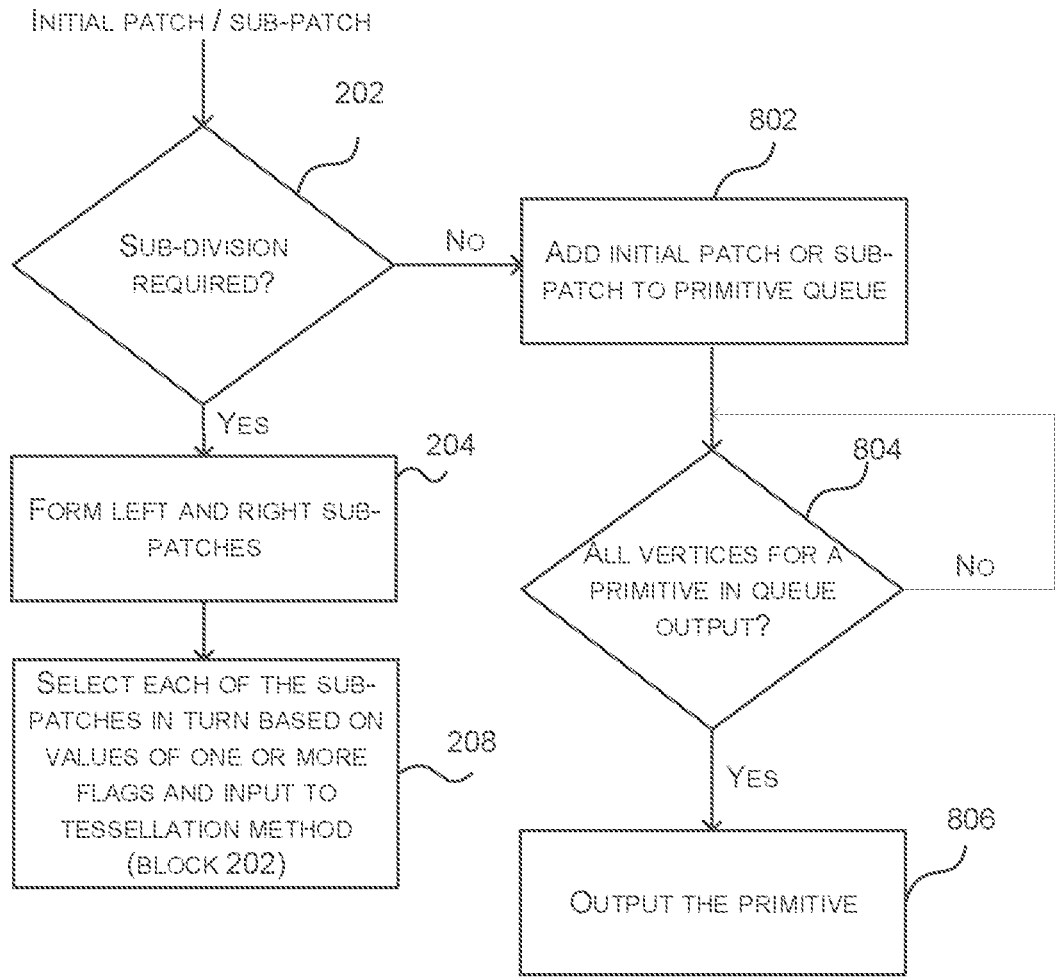
FIG. 8 is a flow diagram showing a variation of the method shown in FIG. 2A.

Using the method shown in FIG. 7, there is a possibility that the ordering can produce a primitive (according to the method of FIG. 2A or 2B) before all of its vertices have been output (in block 714). In examples where the primitives are specified as a triple of indices (which is used to assemble triangle patches before rasterisation) and these indices are determined by the order of the output vertices, the primitive cannot be output before all of its vertices. Consequently, the method of FIG. 2A may be modified as shown in FIG. 8 (and the method of FIG. 2B may be modified similarly). As shown in FIG. 8, instead of immediately outputting the initial patch or sub-patch as a primitive (as in block 212 of FIG. 2A), the initial patch or sub-patch is added to a queue that is configured to hold triples of UV parameters (or different groups of UV parameters, where the patches are not triangular) which in turn define the primitive/patch (block 802). Only when all the vertices of the initial patch or sub-patch have been output ('Yes' in block 804) is the initial patch or sub-patch output as a primitive, e.g. in the form of a triple of vertex indices (block 806). It will be appreciated that in a variation of the method shown in FIG. 8, initial patches or sub-patches may not automatically be added to the queue (in block 802), but instead, prior to adding the initial patch or sub-patch to the queue (in block 802), a check may be performed (as in block 804) to determine if all the vertices of the initial patch or sub-patch have already been output, in which case the initial patch or sub-patch can be output as a primitive (in block 806) without ever being placed in the queue.

The table below shows an example of the operation of the method of FIGS. 7 and 8 for the quad shown in FIG. 6. The table shows the contents at each stage in the method of both the stack (referred to as the 'out vertex stack') and the queue (referred to as the 'UV primitive queue'). Whilst the table shows the UV primitive queue as comprising triples of indices, as described above, this is for brevity only. As described above, the indices are not determined until the vertices are output and so the UV primitive queue actually stores triples of UV coordinates (and may store different numbers of UV coordinates in examples where the patches are not triangular).

| Current Primitive Index | Out Vertex Stack 2T + 2 entries | | | | # Verts Output | 3 Vert IDs of Output Primitive | UV Primitive Queue (Represented here as 3 Vertex IDs) $2^{2T-3}$ Entries | | |
|---|---|---|---|---|---|---|---|---|---|
| Initially | 19 | 7 | 3 | | 2 | — | | | |
| 0 | 19 | 7 | 3 | ~~2~~ | 3 | (2, 0, 1) | | | |
| 1 | 19 | 7 | ~~3~~ | | 4 | (2, 3, 0) | | | |
| 2 | 19 | 7 | ~~4~~ | | 5 | (4, 0, 3) | | | |
| 3 | 19 | 7 | ~~5~~ | | 6 | (5, 0, 4) | | | |
| 4 | 19 | 7 | ~~6~~ | | 7 | (6, 5, 4) | | | |
| 5 | 19 | ~~7~~ | | | 8 | (6, 7, 5) | | | |
| 6 | 19 | 11 | 5 | ~~8~~ | 9 | (8, 5, 7) | | | |
| 7 | 19 | 11 | 5 | ~~9~~ | 10 | (9, 5, 8) | | | |
| 8 | 19 | 11 | ~~5~~ | | 10 | — | (9, 8, 11) | | |
| 9 | 19 | 11 | 10 | ~~9~~ | 10 | — | (9, 8, 11) | (9, 11, 10) | |
| 10 | 19 | 11 | ~~10~~ | | 11 | — | (9, 8, 11) | (9, 11, 10) | (9, 10, 5) |
| 11 | 19 | ~~11~~ | | | 12 | (10, 0, 5) | ~~(9,8,11)~~ | ~~(9,11,10)~~ | ~~(9,10,5)~~ |
| 12 | 19 | 13 | ~~10~~ | | 12 | — | (10, 13, 0) | | |
| 13 | 19 | 13 | ~~12~~ | | 13 | — | (10, 13, 0) | (12, 13, 10) | |
| 14 | 19 | ~~13~~ | | | 14 | (12, 10, 11) | ~~(10,13,0)~~ | ~~(12,13,10)~~ | |
| 15 | 19 | 16 | 12 | ~~14~~ | 15 | (14, 12, 11) | | | |
| 16 | 19 | 16 | ~~12~~ | | 15 | — | (14, 16, 12) | | |
| 17 | 19 | 16 | ~~15~~ | | 16 | — | (14, 16, 12) | (15, 12, 16) | |
| 18 | 19 | ~~16~~ | | | 17 | (15, 13, 12) | ~~(14,16,12)~~ | ~~(15,12,16)~~ | |
| 19 | 19 | 17 | ~~15~~ | | 17 | — | (15, 17, 13) | | |
| 20 | 19 | ~~17~~ | | | 18 | (15, 16, 17) | ~~(15,17,13)~~ | | |
| 21 | 19 | ~~18~~ | | | 19 | (18, 17, 16) | | | |
| 22 | ~~19~~ | | | | 20 | (18, 19, 17) | | | |
| 23 | 22 | 13 | 21 | 17 | ~~20~~ | 21 | (20, 17, 19) | | |
| 24 | 22 | 13 | 21 | ~~17~~ | 21 | — | (20, 21, 17) | | |
| 25 | 22 | 13 | ~~21~~ | | 22 | (17, 21, 13) | ~~(20,21,17)~~ | | |
| 26 | 22 | ~~13~~ | | | 22 | — | (21, 22, 13) | | |
| 27 | ~~22~~ | | | | 23 | (13, 22, 0) | ~~(21,22,13)~~ | | |
| 28 | | | | | 23 | (22, 1, 0) | | | |

As shown in the table above, after processing the final patch (22,1,0), the stack will be empty and so no vertex is popped off.

The table above also indicates the number of entries in the out vertex stack (2T+2) and the UV primitive queue ($2^{2T-3}$) for the quad domain. The value T is the maximum Tessellation Factor of the system, in log base 2. For the triangle domain, the size of the out vertex stack is slightly smaller (because the domain has fewer corner vertices) and comprises 2T+1 entries.

In standard, known vertex ordering, child vertices are always emitted after both parent vertices. In contrast, in the improved ordering described herein, child vertices are produced between the two parent vertices (except where the top left corner vertex or the middle vertex of the quad are parents).

Figure 10:
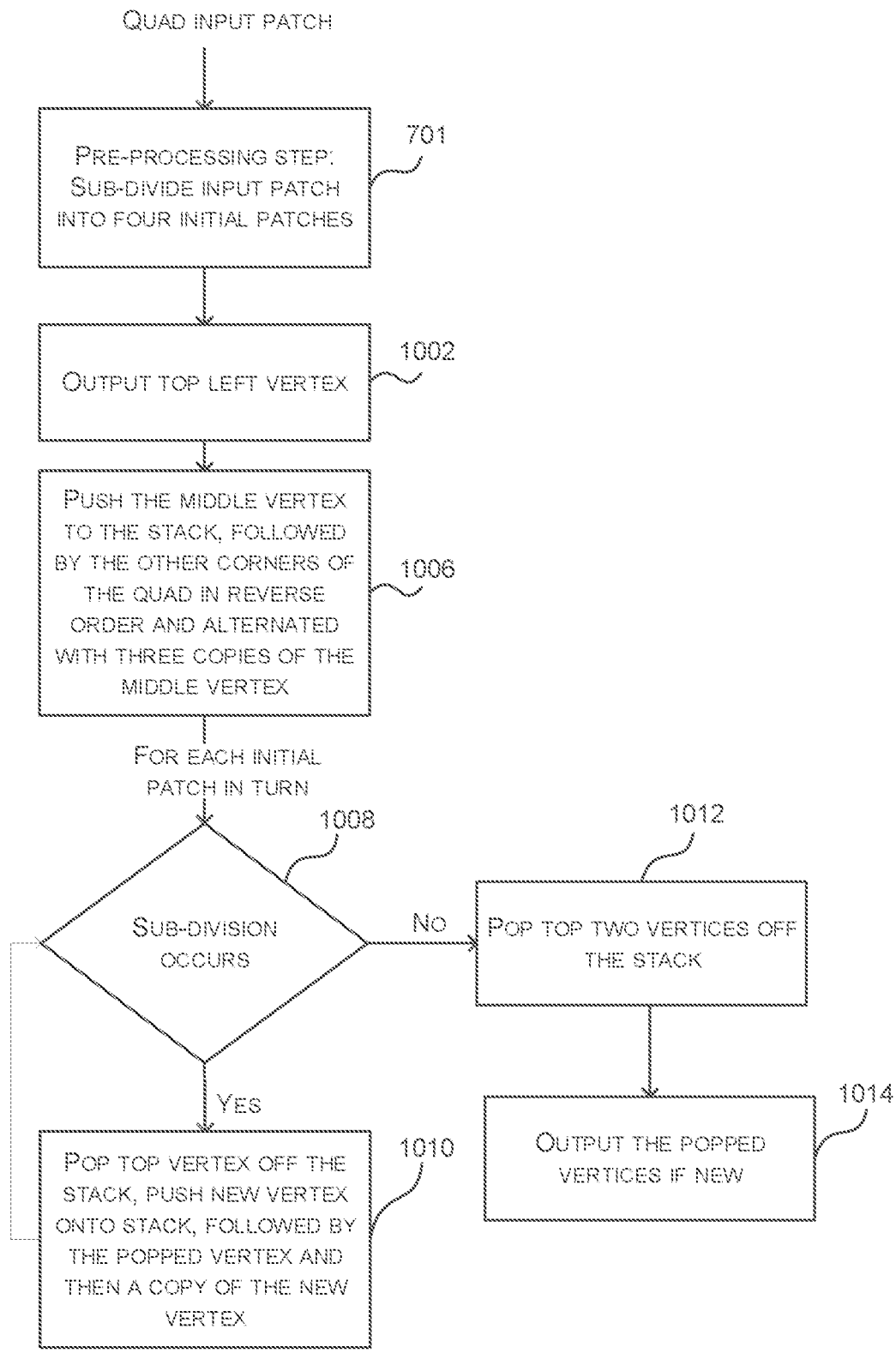
FIG. 10 is a flow diagram showing another example method of ordering the vertices.
Figure 12:
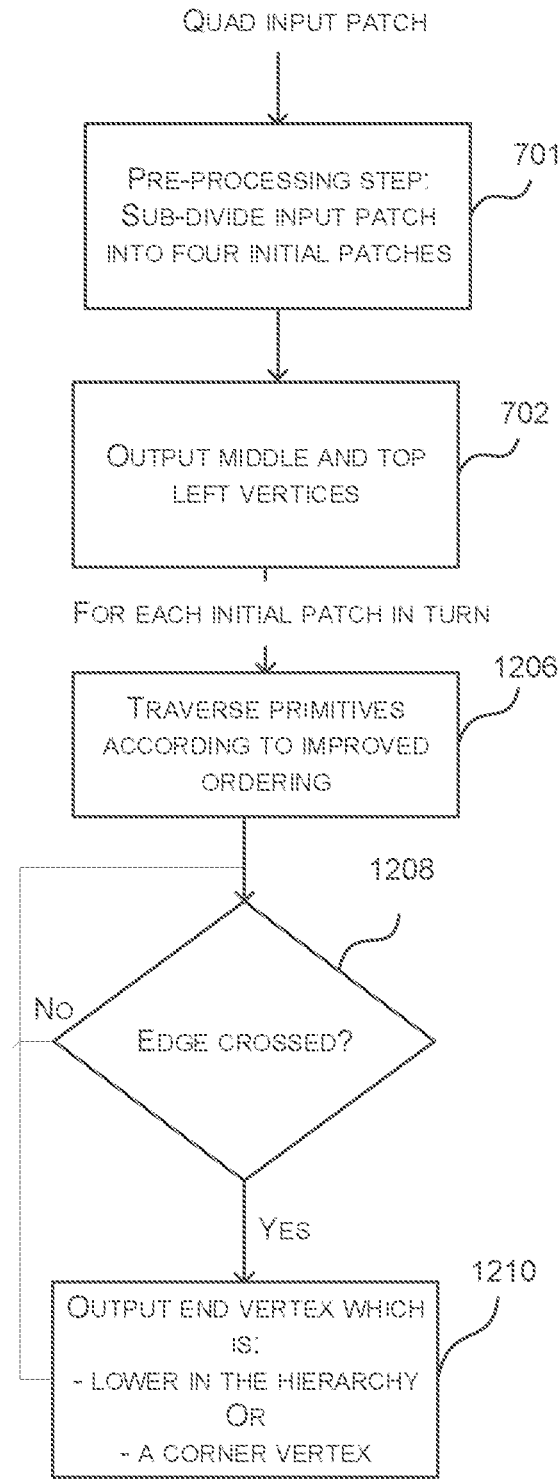
FIG. 12 is a flow diagram showing an example method of ordering the vertices which corresponds to the method shown in FIG. 7.
Figure 13:
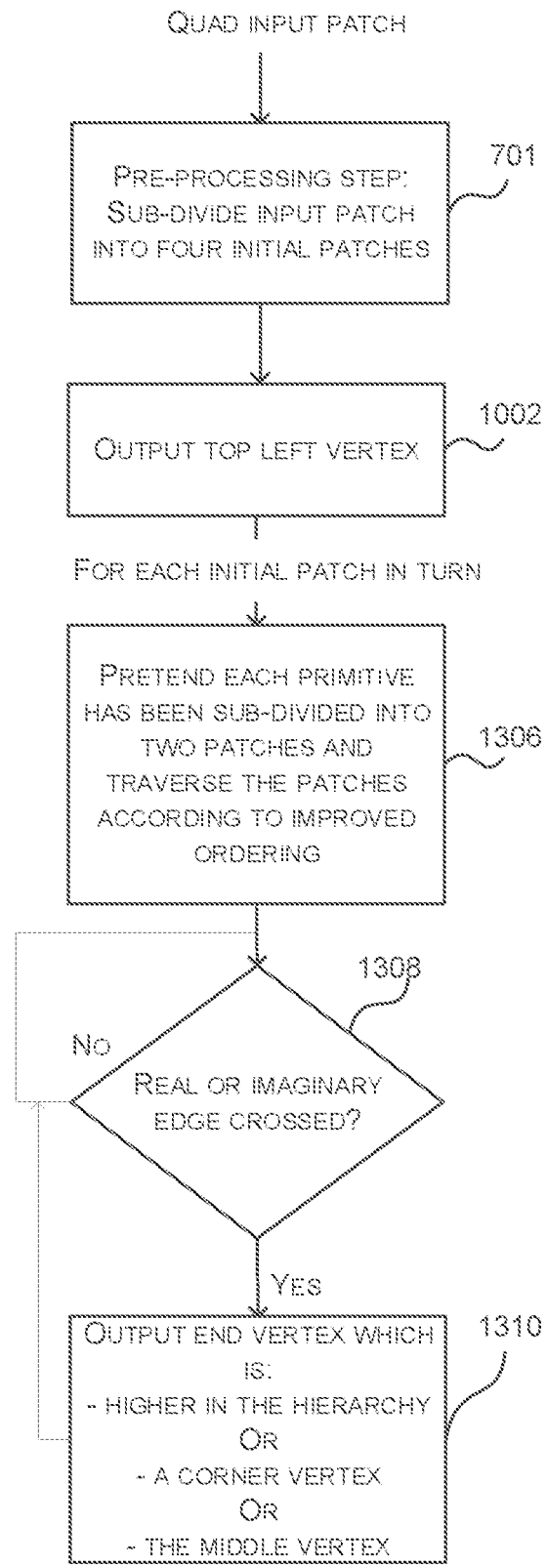
FIG. 13 is a flow diagram showing an example method of ordering the vertices which corresponds to the method shown in FIG. 10.

The generation of vertices according to the triangle strip ordering scheme is described with reference to FIGS. 9 and 10. FIG. 9 shows a further example ordering in which both the vertices and the primitives are numbered in order and FIG. 10 is a flow diagram showing an example method of ordering the vertices. Although FIGS. 10, 12 and 13 are described below in relation to the quad domain, the methods may also be applied to other polygonal domains.

To generate vertices according to the triangle strip ordering shown in FIG. 9, a stack (or other equivalent data structure) is used to hold vertices which have been generated (e.g. by sub-division in the method of FIG. 2A or 2B) prior to their output. As shown in FIG. 10, when sub-division of a patch occurs ('Yes' in block 1008, e.g. as in block 204 of FIG. 2A or block 204' of FIG. 2B) and a new vertex is formed (e.g. M as shown in FIG. 3B), the top-most vertex on the stack (V) is popped from the stack and the new vertex (M) is pushed onto the stack followed by the popped vertex (V) and then a copy of the new vertex (M) (block 1010). When a triangle patch is reached where no sub-division is made ('No' in block 1008, e.g. 'No' in block 202 of FIG. 2A or 2B, which may be part of a recursion in block 208 of FIG. 2A or 2B), then two vertices are popped off the stack (block 1012) and any of the popped vertices are output if the vertex is new (block 1014). This means that whilst a vertex may be added to the stack more than once (because it defines more than one initial or sub-patch), each vertex is only output once.

The example shown in FIG. 9 relates to a quad patch and to initialize the method and the stack, as shown in FIG. 10, the top left vertex of the quad patch is output initially (block 1002) and then the middle vertex is pushed onto the stack followed by the other corners of the quad patch in reverse order and alternated with three copies of the middle vertex (block 1006, e.g. middle vertex, bottom left, middle vertex, bottom right middle vertex, top right, middle vertex). In this way, four copies of middle vertex are initially pushed onto the stack (in block 1006). If the initial triangle patches formed by pre-processing of the domain (in block 701) are processed in clockwise order this reverse order is a counter-clockwise ordering of the corner vertices, and if the initial triangle patches are processed in counter-clockwise order this reverse order is a clockwise ordering. In other examples the vertex corner output first by the scheme (in block 1002) may be any one of the corner vertices.

Using the method shown in FIG. 10, there is no possibility that a primitive will be output before all of its vertices and hence no primitive queue is required.

The table below shows an example of the operation of the method of FIG. 10 for the quad shown in FIG. 9. The table shows the contents of the stack at each stage in the method along with the vertices and primitives output at each stage.

| Current Primitive Index | Out Vertex Stack 4T + 5 entries | | | | | | | | | | #Verts Output | 3 Vert IDs of Output Primitive |
|---|---|---|---|---|---|---|---|---|---|---|---|---|
| Initially | 2 | 19 | 2 | 7 | 2 | 3 | 2 | | | | 1 | — |
| 0 | 2 | 19 | 2 | 7 | 2 | 3 | 1 | ~~2~~ | ~~1~~ | | 3 | (1, 2, 0) |
| 1 | 2 | 19 | 2 | 7 | 2 | ~~3~~ | ~~1~~ | | | | 4 | (1, 3, 2) |
| 2 | 2 | 19 | 2 | 7 | 4 | ~~2~~ | ~~4~~ | | | | 5 | (4, 2, 3) |
| 3 | 2 | 19 | 2 | 7 | 5 | ~~4~~ | ~~5~~ | | | | 6 | (5, 2, 4) |
| 4 | 2 | 19 | 2 | 7 | 6 | ~~5~~ | ~~6~~ | | | | 7 | (6, 5, 4) |
| 5 | 2 | 19 | 2 | ~~7~~ | ~~6~~ | | | | | | 8 | (6, 7, 5) |
| 6 | 2 | 19 | 10 | 2 | 5 | 10 | 8 | ~~5~~ | ~~8~~ | | 9 | (8, 5, 7) |
| 7 | 2 | 19 | 10 | 2 | 5 | 10 | 9 | ~~8~~ | ~~9~~ | | 10 | (9, 5, 8) |
| 8 | 2 | 19 | 10 | 2 | 5 | ~~10~~ | ~~9~~ | | | | 11 | (9, 8, 10) |
| 9 | 2 | 19 | 10 | 2 | 11 | 5 | 9 | ~~10~~ | ~~9~~ | | 12 | (9, 10, 11) |
| 10 | 2 | 19 | 10 | 2 | 11 | ~~5~~ | ~~9~~ | | | | 12 | (9, 11, 5) |
| 11 | 2 | 19 | 10 | ~~2~~ | ~~10~~ | | | | | | 12 | (11, 2, 5) |
| 12 | 2 | 19 | 12 | 10 | 11 | ~~2~~ | ~~10~~ | | | | 13 | (11, 12, 2) |
| 13 | 2 | 19 | 12 | 10 | 13 | ~~11~~ | ~~13~~ | | | | 14 | (13, 12, 11) |
| 14 | 2 | 19 | 12 | ~~10~~ | ~~13~~ | | | | | | 14 | (13, 11, 10) |
| 15 | 2 | 19 | 15 | 12 | 13 | 15 | 14 | ~~13~~ | ~~14~~ | | 15 | (14, 13, 10) |
| 16 | 2 | 19 | 15 | 12 | 13 | ~~15~~ | ~~14~~ | | | | 16 | (14, 15, 10) |
| 17 | 2 | 19 | 15 | 12 | 16 | ~~13~~ | ~~16~~ | | | | 17 | (16, 13, 15) |
| 18 | 2 | 19 | 15 | ~~12~~ | ~~16~~ | | | | | | 17 | (16, 12, 13) |
| 19 | 2 | 19 | 17 | 15 | 16 | ~~17~~ | ~~16~~ | | | | 18 | (16, 17, 12) |
| 20 | 2 | 19 | 17 | ~~15~~ | ~~16~~ | | | | | | 18 | (16, 15, 17) |
| 21 | 2 | 19 | 18 | ~~17~~ | ~~18~~ | | | | | | 19 | (18, 17, 15) |
| 22 | 2 | ~~19~~ | ~~18~~ | | | | | | | | 20 | (18, 19, 17) |
| 23 | 22 | 2 | 12 | 22 | 21 | 12 | 17 | 21 | 20 | ~~17~~ ~~20~~ | 21 | (20, 17, 19) |
| 24 | 22 | 2 | 12 | 22 | 21 | 12 | 17 | ~~21~~ | ~~20~~ | | 22 | (20, 21, 17) |
| 25 | 22 | 2 | 12 | 22 | 21 | ~~12~~ | ~~17~~ | | | | 22 | (17, 21, 12) |
| 26 | 22 | 2 | 12 | ~~22~~ | ~~21~~ | | | | | | 23 | (21, 22, 12) |
| 27 | 22 | ~~2~~ | ~~12~~ | | | | | | | | 23 | (12, 22, 2) |
| 28 | ~~22~~ | | | | | | | | | | 23 | (22, 0, 2) |

The table above also indicates the number of entries in the out vertex stack for the quad domain (4T+5), where, as described above, T is the maximum Tessellation Factor of the system, in log base 2. For the triangle domain, the size of the out vertex stack is slightly smaller (because the domain has fewer corner vertices) and comprises 4T+3 entries.

Figure 11:
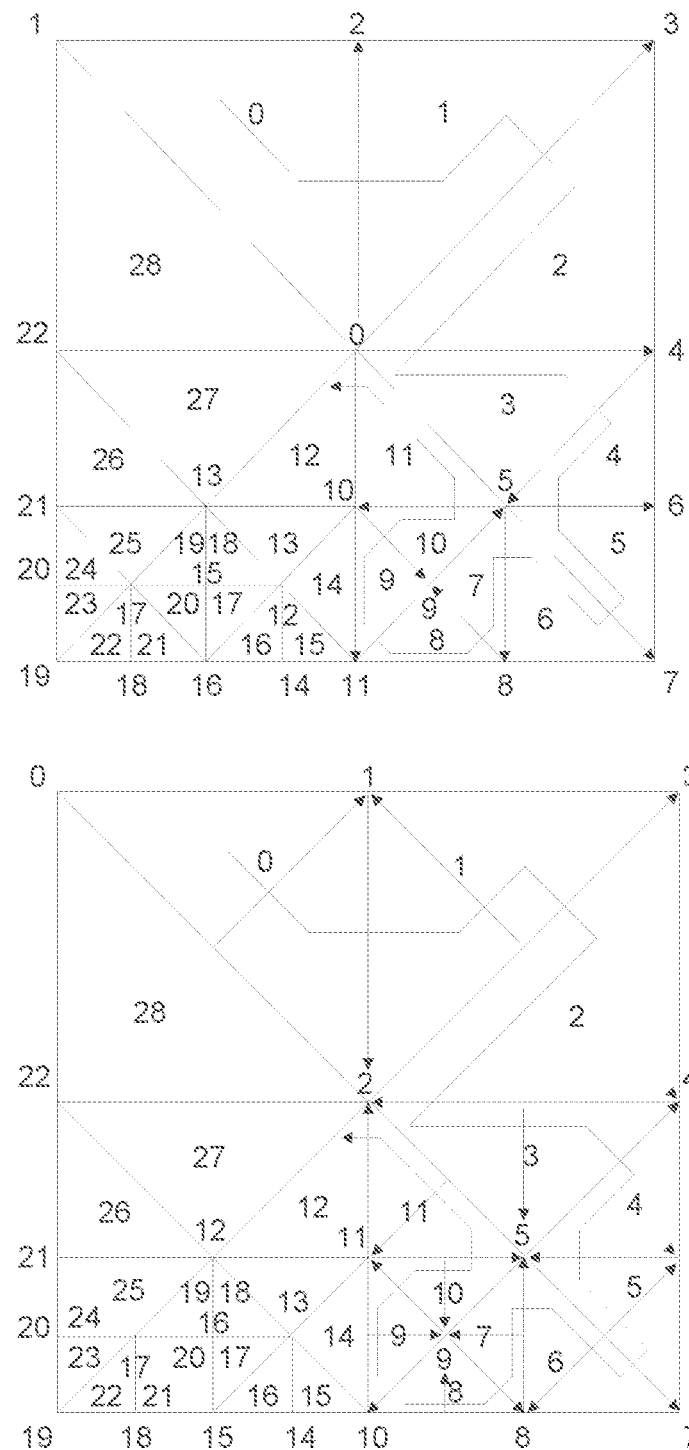
FIG. 11 shows schematic diagrams illustrating the two example methods of ordering the vertices.

Whilst the two vertex ordering schemes (improved ordering and triangle strip ordering) are described above with reference to the pushing of vertices to a stack and the popping of vertices from that stack, the two schemes may alternatively be described with reference to edge ordering, as shown in FIGS. 11-13.

In the diagram on the left in FIG. 11, which shows the improved vertex ordering scheme, the ordering is produced (as shown in FIG. 12) by first outputting the middle vertex followed by the top left vertex of the quad domain (block 702) and then traversing the primitives in their improved ordering (block 1206, e.g. as shown by the line through the primitives in FIG. 11). Each time an edge of a primitive is crossed ('Yes' in block 1208), the end vertex for that edge which is lower in the hierarchy or a corner vertex is output (block 1210). The phrase 'lower in the hierarchy' refers to a vertex that only arises in a more sub-divided domain and a corner vertex (e.g. a domain vertex with a coordinate of (0,0), (0,1), (1,0) or (1.1)) supersedes any other vertex.

In the diagram on the right in FIG. 11, which shows the triangle strip ordering scheme, the ordering is produced (as shown in FIG. 13) by first outputting the top left vertex of the domain (block 1002), pretending that each primitive has been sub-divided into two patches (as indicated by the additional edges compared to the left diagram in FIG. 11) and then traversing the primitives in their improved ordering (block 1306). Each time an edge is crossed ('Yes' in block 1308), where the edge may be an actual edge of a primitive or an imaginary (or notional) edge as a result of the notional sub-division of each primitive (from block 1306), the end vertex for that edge which is higher in the hierarchy or a corner vertex or the middle vertex is output (block 1310). The phrase 'higher in the hierarchy' refers to a vertex that arises in a less sub-divided domain, and a corner vertex (e.g. vertices 0, 3, 7 and 19) supersedes the middle vertex (e.g. vertex 2), which supersedes any other vertex.

Both the improved vertex ordering and the triangle strip vertex ordering provide a coherent ordering for vertices in UV space and for primitives. Whilst the improved vertex ordering requires two additional data structures—one to store vertices and the other to store primitive data, the triangle strip vertex ordering only requires a single data structure (to store vertices) and the triangle strip vertex ordering is more coherent than the improved vertex ordering. As demonstrated by the tables above for the two different ordering schemes, the size of the stack that is required for triangle strip vertex ordering is larger than for improved vertex ordering. Although the two ordering schemes described herein do require additional data structures, the size of the vertex cache that stores post domain shader vertices can be reduced (as a consequence of the coherency, as described above) and as each entry in the vertex cache is large (e.g. up to 128 floats), a single entry in that cache can be larger than the size of the additional data structures and hence there is a significant overall saving in the amount of data that is stored.

Whilst the vertex ordering methods are described above with reference to the quad domain (i.e. a quad input patch), the methods are also applicable to the triangle domain and to the isoline domain or any other polygonal domain. In the case of the triangle domain, the pre-processing step (block 701) sub-divides the triangle input patch into three initial triangle patches. Additionally, only two corner vertices are pushed to the stack (in block 706) in the case of the improved ordering and only two corner vertices and three copies of the middle vertex are pushed onto the stack (in block 1006) in the case of triangle strip ordering. The triangle domain also requires a smaller stack than the quad domain (as described above). In the case of the isoline domain, the two orderings are equivalent and order the vertices in left to right order and no pre-processing step is required. No UV primitive queue is required and the vertex stack can be smaller than for the triangle domain (e.g. just T+1 entries). Any other polygonal domain (e.g. hexagon, octagon) behaves analogously to the quad or triangle domain but more initial triangle patches are formed from pre-processing and it requires a larger stack and UV primitive queue.

Described above is an improved method of primitive ordering during tessellation and two different improved methods of vertex ordering during tessellation. These methods may be used together or separately and consequently five different combinations are described herein:

|   | Primitive Ordering | Vertex Ordering |
|---|---|---|
| 1 | Improved ordering (as shown in FIG. 2A or 2B) | * |
| 2 | Improved ordering (as shown in FIG. 2A or 2B) | Improved ordering (as shown in FIG. 7) |
| 3 | Improved ordering (as shown in FIG. 2A or 2B) | Triangle strip ordering (as shown in FIG. 10) |
| 4 | * | Improved ordering (as shown in FIG. 7) |
| 5 | * | Triangle strip ordering (as shown in FIG. 10) |

Where no specific primitive or vertex ordering is specified (as indicated by the asterisk in the table above), any method of primitive/ordering may be used and/or a tessellation method may be used which does not explicitly control the order in which primitives/vertices are output.

Any reference to a 'stack' in the above description refers to a data structure which operates a first in, last out scheme and any data structure which supports this first in, last out scheme may be used (e.g. a random access memory may be used as it can model a stack)

As described above, the primitive and vertex ordering methods described herein may be used with any tessellation method that involves binary sub-division. One example method is described in GB2533443 and shown in FIGS. 15 and 16.

Figure 15:
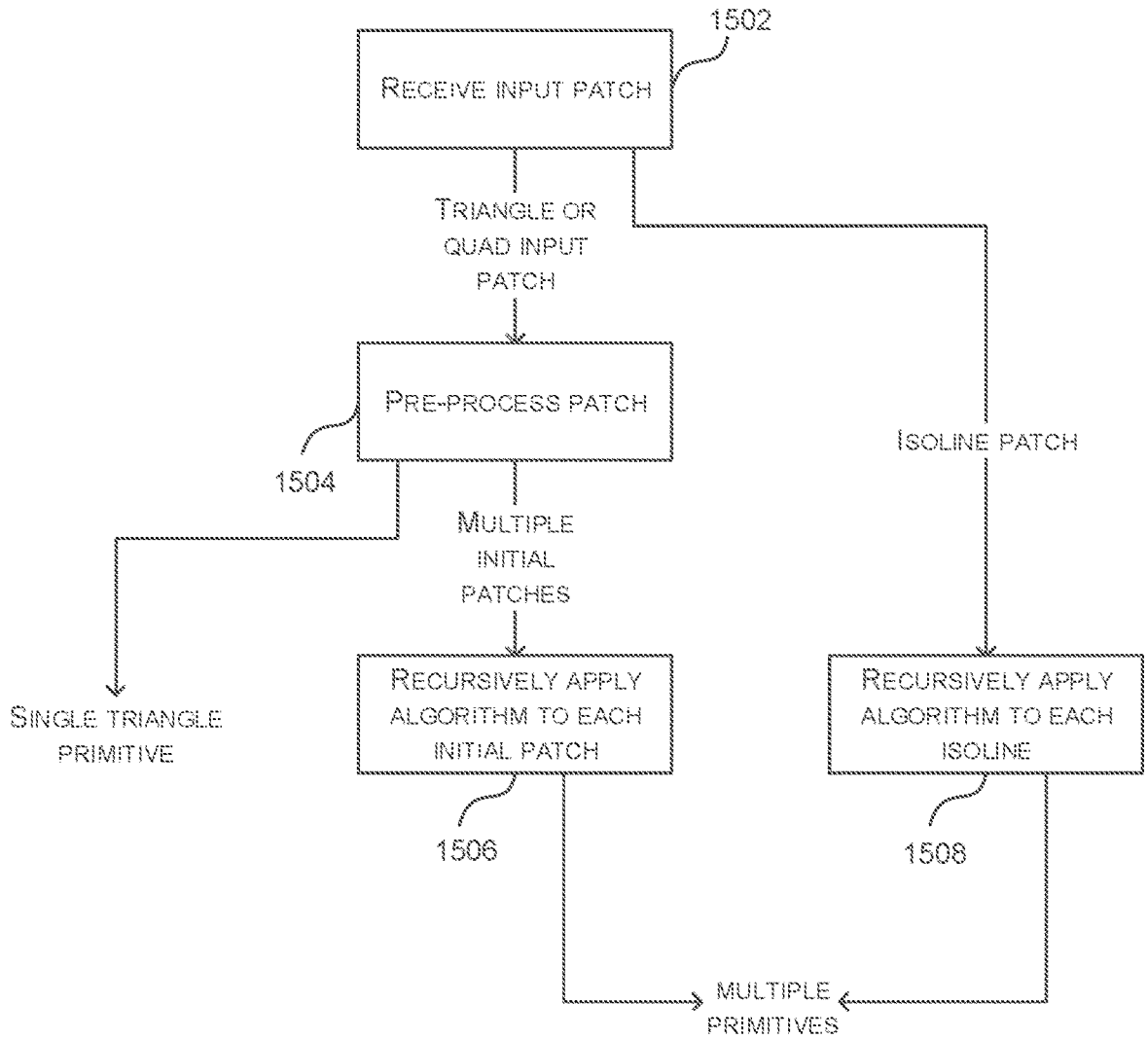
FIG. 15 is a flow diagram showing an example tessellation method which may be used in combination with the ordering methods described herein.

FIG. 15 is a flow diagram of the tessellation method. The method starts when a patch (referred to as an input patch) is fed into the tessellator. The tessellator (which may be a hardware tessellator) receives the input patch (block 1502) where this input patch may be a triangle patch, a quad patch or an isoline patch. Whilst the quad patch is a square in domain space (with vertices at (0,0), (1,0), (0,1) and (1,1)), the shape it represents in world space (i.e. within the 3D or 2D environment) may be a different shape. As described above, tessellation is performed in domain space and not in world space.

If the input patch is a triangle patch or a quad patch covering the entire domain, the patch undergoes a 'pre-processing' stage (block 1504) before the tessellation algorithm is recursively applied to initial triangle patches within the input patch (block 1506). The pre-processing stage is used to ensure tessellation is independent of orientation and as a result is not required for an isoline patch (as the algorithm works symmetrically and so there is no orientation dependence of any resulting tessellation). This pre-processing stage is the same as the pre-processing stage (block 701) described above with reference to FIGS. 7, 10, 12, and 13.

Figure 14A:
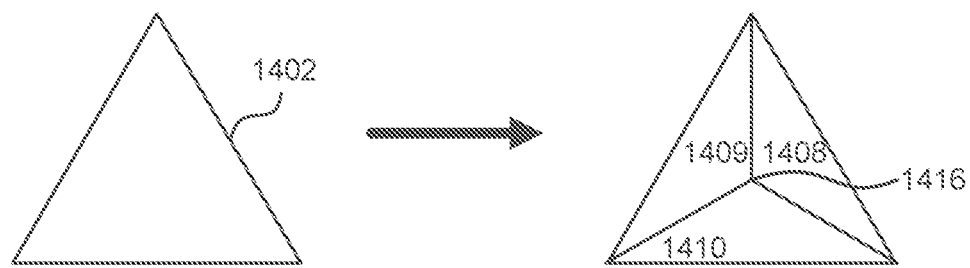
FIGS. 14A and 14B are schematic diagrams illustrating a pre-processing stage of the tessellation methods described herein.
Figure 14B:
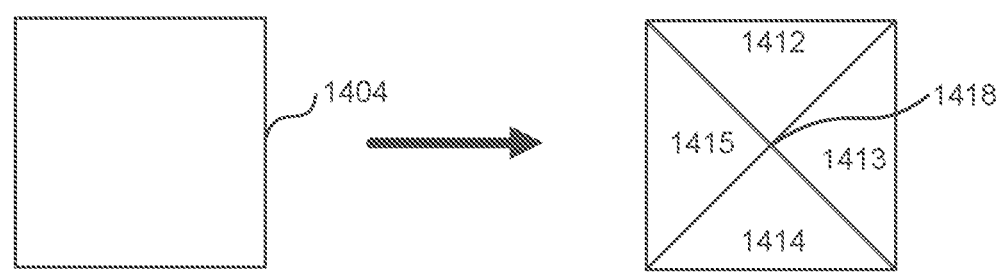

An example of a pre-processing stage to generate initial patches is described in GB2533443 and shown in FIGS. 14A and 14B. The pre-processing stage is used to ensure tessellation is independent of orientation. If the input patch is a triangle patch 1402, the pre-processing stage outputs either one triangle patch 1402 (which is the same as the input triangle patch and where no tessellation is required) or three triangle patches 1408-1410, as shown in FIG. 14A. If the input patch is a quad patch 1404, the pre-processing stage outputs four triangle patches 1412-1415, as shown in FIG. 14B. Similar techniques may also be applied to an input polygon patch to sub-divide it into a plurality of initial triangle patches.

If the input patch is a triangle patch, the pre-processing stage (block 1504) outputs either one triangle patch as a primitive (which is the same as the input triangle patch and where no tessellation is required) or generates three initial triangle patches. If the input patch is a quad patch, the pre-processing stage (block 1504) generates four initial triangle patches. If the input patch is an isoline patch, no pre-processing is required (for the reasons set out above) and the tessellation algorithm is recursively applied to the input isoline patch (block 1508). It will be appreciated that whilst these initial patches are described as being triangular, this is by way of example only and in other examples the initial patches may have more than three sides. Furthermore, whilst in the description above, the pre-processing operation (in block 1504) generates three or four initial patches, in other examples, the pre-processing operation (in blocks 701 and 1504) may generate a different number of initial patches (e.g. one, two or more than four initial patches).

Figure 16:
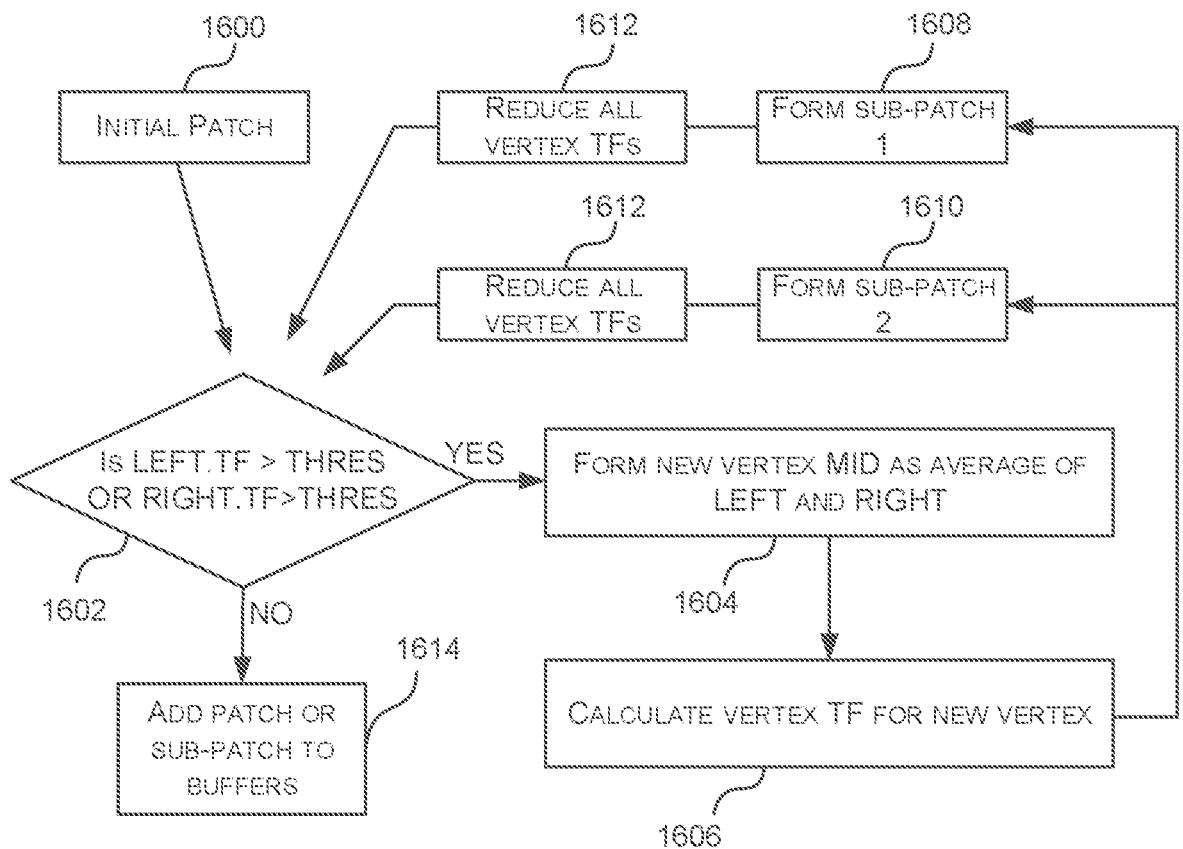
FIG. 16 is a flow diagram showing the recursive algorithm used in the method of FIG. 15.

FIG. 16 is a flow diagram of the recursive application of an algorithm to each of the three or four (or more) initial patches generated by the pre-processing stage and this can be described with reference to the triangle 302 shown in FIG. 3A. As shown in FIG. 3A, a triangle patch is an ordered set of three vertices (T,L,R) in a clockwise direction. Note that the first vertex is always the top (T) vertex and for an initial triangle patch (as generated by the pre-processing stage) this 'top' vertex corresponds to a mid (M) vertex which is added during the pre-processing.

As shown in FIG. 16, given a triangle patch tessellation occurs if and only if $$\text{LEFT} \cdot TF > THRES \text{ or } \text{RIGHT} \cdot TF > THRES \tag{1}$$

where LEFT. TF is the vertex TF of the LEFT (L) vertex and RIGHT. TF is the vertex TF of the RIGHT (R) vertex ('Yes' in block 1602).

If LEFT.TF>THRES or RIGHT.TF>THRES ('Yes' in block 1602), a new vertex MID (M) is formed (in block 1604) which divides the edge LEFT→RIGHT in domain space into two parts. The vertex tessellation factor for the new MID vertex is then calculated (in block 1606) to be:

$$MID \cdot TF = \text{MEAN}(\text{LEFT} \cdot TF, \text{RIGHT} \cdot TF) \tag{2}$$

where MID. TF is the vertex TF of the MID vertex, LEFT. TF is the vertex TF of the LEFT vertex and RIGHT.TF is the vertex TF of the RIGHT vertex. For convention the vertices LEFT and RIGHT which define the edge which MID sub-divides are denoted the "parents" of MID.

In many examples, the new vertex MID is added as the bisector of the edge LEFT→RIGHT in domain space. However, in other examples, the new vertex MID may be added at a position which is on the edge LEFT→RIGHT in domain space but which does not exactly bisect it. In various examples, the position of MID along the edge may be weighted, e.g. using the vertex TFs of the parent vertices.

Two sub-patches (MID, LEFT, TOP) and (MID, TOP, RIGHT) are formed (blocks 1608 and 1610) and all tessellation factors in each triangle patch are reduced by the parameter INTERVAL, which is a pre-defined, non-zero constant (block 1612, i.e. by subtracting INTERVAL where log base 2 notation is used). The method then recurses on each of these sub-patches. When performing the method on a sub-patch created in block 1608 or block 1610 the 'TOP' vertex corresponds to the 'MID' vertex which was added (in block 1604) to create the sub-patch and this will be different to the 'TOP' vertex of the parent patch (which as described above may be the initial patch or another sub-patch formed in an earlier level of recursion).

If at any stage no tessellation occurs ('No' in block 1602) a triangle primitive (which is equivalent to the sub-patch) is added to a buffer (block 1614), e.g. to an index buffer.

As described above, the method of FIG. 16 is applied to each of the initial patches that are generated by the pre-processing stage (block 1504) and recursively to any sub-patches created by the sub-division of those initial patches.

As the vertex tessellation factors are finite and INTERVAL is constant and non-zero eventually all the vertex tessellation factors (in all the triangle patches) will be at most THRES and the process will terminate.

The newly added MID vertex is a vertex in both of the two sub-patches which are formed (in blocks 1608 and 1610) and in both sub-patches this vertex is considered to be the 'TOP' vertex. The current value of the vertex tessellation factor of the newly added MID vertex must be used when recursing into both of the sub-patches. In example implementations that can be ensured either by duplicating the vertex TF for each sub-patch or having a final step to the algorithm in which, for any parent patch or sub-patch and after recursion on its two child sub-patches, each vertex TF is increased by the parameter INTERVAL.

The same algorithm that is used in FIG. 16 may also be applied to an isoline patch (in block 1508) although, as described above, no pre-processing is required and in the case of an isoline patch, the algorithm is applied to lines (i.e. isolines and sub-isolines) rather than triangles.

The tessellation method shown in FIG. 16 described above uses a MEAN( ) function (see equation (2) above). Whilst this could, in some examples, be the arithmetic mean of the vertex tessellation factors, which would result in a smooth introduction of geometry when moving from one vertex to another, such a function would often result in T-junctions appearing and hence cracking for certain values of vertex TF (e.g. where the difference in vertex TFs across a patch is quite extreme). Consequently, in many examples, an alternative function is used for MEAN( ) as follows:

$$\text{MEAN}(TF1, TF2, \ldots) = \text{MIN}(AVG(TF1, TF2, \ldots), \text{MIN}(TF1, TF2, \ldots) + \text{INTERVAL}) \quad (3)$$

where AVG( ) is the arithmetic mean of a list of values within the parentheses (e.g. vertex TF1, vertex TF2, . . . in the example above) and MIN( ) is the minimum of a list of values within the parentheses (e.g. vertex TF1, vertex TF2, . . . in the example above).

A first further example provides a method of performing tessellation in a computer graphics system, the method comprising: analysing an initial patch to determine whether to sub-divide the patch; in response to determining that the initial patch is to be sub-divided, dividing the initial patch into two or more sub-patches; and selecting and tessellating each sub-patch until there is no further sub-division of that sub-patch, wherein sub-patches are selected for tessellation in an order encoded by one or more stored values.

Dividing the initial patch or a sub-patch into two or more sub-patches may comprise: adding a new vertex; and the method further comprising, in response to determining that the initial patch or sub-patch is to be sub-divided: popping a top vertex from a data structure operating a first in, last out scheme; pushing the new vertex into the data structure, followed by the popped vertex and a copy of the new vertex; and in response to determining that the initial patch or sub-patch is not to be sub-divided, popping two vertices from the data structure and outputting any of the popped vertices that have not previously been output. The method may further comprise, prior to adding a first new vertex to the data structure: outputting a first corner vertex of a polygonal domain; and initializing the data structure by pushing a middle vertex of the polygonal domain into the data structure, followed by pushing a fourth corner vertex, then a copy of the middle vertex, then the third corner vertex, then a copy of the middle vertex, then the second corner vertex followed by a copy of the middle vertex into the stack. The corner vertices may be ordered in a clockwise or counter-clockwise ordering. The polygonal domain may be a quad domain.

A second further example provides a tessellation unit configured to perform tessellation in a graphics processing pipeline, wherein the tessellation unit comprises hardware logic arranged to: analyse an initial patch to determine whether to sub-divide the patch; in response to determining that the initial patch is to be sub-divided, divide the input patch into two or more sub-patches; and select and tessellate each sub-patch until there is no further sub-division of that sub-patch, wherein sub-patches are selected for tessellation in an order encoded by one or more stored values.

The one or more stored values may comprise values of one or more flags.

The tessellation unit may further comprise hardware logic arranged, prior to analysing the initial patch, to: receive an input patch and sub-dividing the input patch into a plurality of initial patches.

The hardware logic may operate recursively at each level of sub-division.

The hardware logic may be arranged to select and tessellate each sub-patch until there is no further sub-division of that sub-patch in an order encoded by one or more stored values by: selecting one of the sub-patches formed by sub-division of the initial patch based on one or more stored values; tessellating the selected sub-patch until there is no further sub-division; and repeating the selecting and tessellating until all the sub-patches formed by sub-division of the initial patch have been tessellated until there is no further sub-division of those sub-patches.

The initial patch may be sub-divided into a left sub-patch and a right sub-patch, wherein the hardware logic is arranged to select one of the sub-patches formed by subdivision of the initial patch based on one or more stored values by: selecting one of the left and right sub-patches formed by sub-division of the initial patch based on one or more stored values; and wherein the hardware logic is arranged to repeat the selecting and tessellating until all the sub-patches formed by sub-division of the initial patch have been tessellated until there is no further sub-division of those sub-patches by: subsequently tessellating the other of the left and right sub-patches formed by sub-division of the initial patch until there is no further sub-division.

The hardware logic may be arranged to tessellate the selected sub-patch until there is no further sub-division by: analysing the selected sub-patch to determine whether to sub-divide the selected sub-patch; in response to determining that the selected sub-patch is to be sub-divided, dividing the selected sub-patch into a left sub-patch and a right sub-patch; selecting one of the left and right sub-patches formed by sub-division of the selected sub-patch based on one or more stored values; first, tessellating the selected sub-patch until there is no further sub-division; and then, tessellating the non-selected sub-patch until there is no further sub-division; and wherein tessellating the non-selected sub-patch until there is no further sub-division comprises: analysing the non-selected sub-patch to determine whether to sub-divide the non-selected sub-patch; in response to determining that the non-selected sub-patch is to be sub-divided, dividing the non-selected sub-patch into a left sub-patch and a right sub-patch; selecting one of the left and right sub-patches formed by sub-division of the non-selected sub-patch based on one or more stored values; first, tessellating the selected sub-patch until there is no further sub-division; and then, tessellating the non-selected sub-patch until there is no further sub-division.

The one or more stored values may comprise one or more flags, wherein the initial patch has one or more ordering flags and wherein the hardware logic is arranged to select one of the patches formed by sub-division of the initial patch based on one or more stored values by: selecting one of the patches formed by sub-division of the initial patch based on values of the one or more ordering flags of the initial patch.

The hardware logic may be arranged to divide the initial patch into two or more sub-patches by: dividing the initial patch into two or more sub-patches; and setting one or more ordering flags for each of the sub-patches formed from the initial patch, wherein the one or more ordering flags for each of the sub-patches formed from the initial patch are derived from the one or more ordering flags of the initial patch.

Each initial patch and each sub-patch may have a single ordering flag and the ordering flag for each sub-patch formed from the initial patch has an opposite value to the ordering flag of the initial patch.

The one or more stored values may comprise one or more flags, wherein the hardware logic is arranged to select one of the patches formed by sub-division of the initial patch based on one or more stored values by: selecting one of the sub-patches formed by sub-division of the initial patch based on a value of an ordering flag.

The tessellation unit may further comprise hardware logic arranged to: invert the value of the ordering flag once for each increase or decrease in a level of sub-division.

The tessellation unit may further comprise hardware logic arranged: in response to determining that the initial patch or a sub-patch is not to be sub-divided, to output the initial patch or sub-patch as a primitive.

The hardware logic may be arranged to divide the initial patch or a sub-patch into two or more sub-patches by: adding a new vertex; and the tessellation unit further comprises hardware logic arranged, in response to determining that the initial patch or a sub-patch is to be sub-divided, to push the new vertex onto a data structure operating a first in, last out scheme; and in response to determining that the initial patch or sub-patch is not to be sub-divided, to pop a vertex from the data structure and output the vertex if it has not previously been output.

The tessellation unit may further comprise hardware logic arranged, in response to determining that the initial patch or sub-patch is not to be sub-divided, to delay output of the initial patch or sub-patch, as a primitive, until all vertices of the initial patch or sub-patch have been output.

The hardware logic may be arranged to delay output of the initial patch or sub-patch until all vertices of the initial patch or sub-patch have been output by: adding the initial patch or sub-patch to a queue; determining whether all vertices of the initial patch or sub-patch have been output; and in response to determining that all the vertices of the initial patch or sub-patch have been output, outputting the initial patch or sub-patch as a primitive.

The hardware logic may be arranged to delay output of the initial patch or sub-patch until all vertices of the initial patch or sub-patch have been output by: determining whether all vertices of the initial patch or sub-patch have been output; and in response to determining that all the vertices of the initial patch or sub-patch have not been output, adding the initial patch or sub-patch to a queue.

The tessellation unit may further comprise hardware logic arranged, prior to adding a first new vertex to the data structure, to: output the middle vertex of a polygonal domain and a first corner vertex of the polygonal domain; and initialize the data structure by pushing vertices corresponding to the other corners of the polygonal domain in either a clockwise or counter-clockwise order into the stack.

The hardware logic may be arranged to divide the initial patch or a sub-patch into two or more sub-patches by: adding a new vertex; and the tessellation unit further comprises hardware logic arranged, in response to determining that the initial patch or sub-patch is to be sub-divided, to: pop a top vertex from a data structure operating a first in, last out scheme; push the new vertex into the data structure, followed by the popped vertex and a copy of the new vertex; and in response to determining that the initial patch or sub-patch is not to be sub-divided, to pop two vertices from the data structure and output any of the popped vertices that have not previously been output.

The tessellation unit may further comprise hardware logic arranged, prior to adding a first new vertex to the data structure, to: output a first corner vertex of a polygonal domain; and initialize the data structure by pushing a middle vertex of the polygonal domain into the data structure, followed by pushing a fourth corner vertex, then a copy of the middle vertex, then the third corner vertex, then a copy of the middle vertex, then the second corner vertex followed by a copy of the middle vertex into the stack.

The corner vertices may be ordered in a clockwise or counter-clockwise ordering.

The polygonal domain may be a quad domain.

Figure 17:
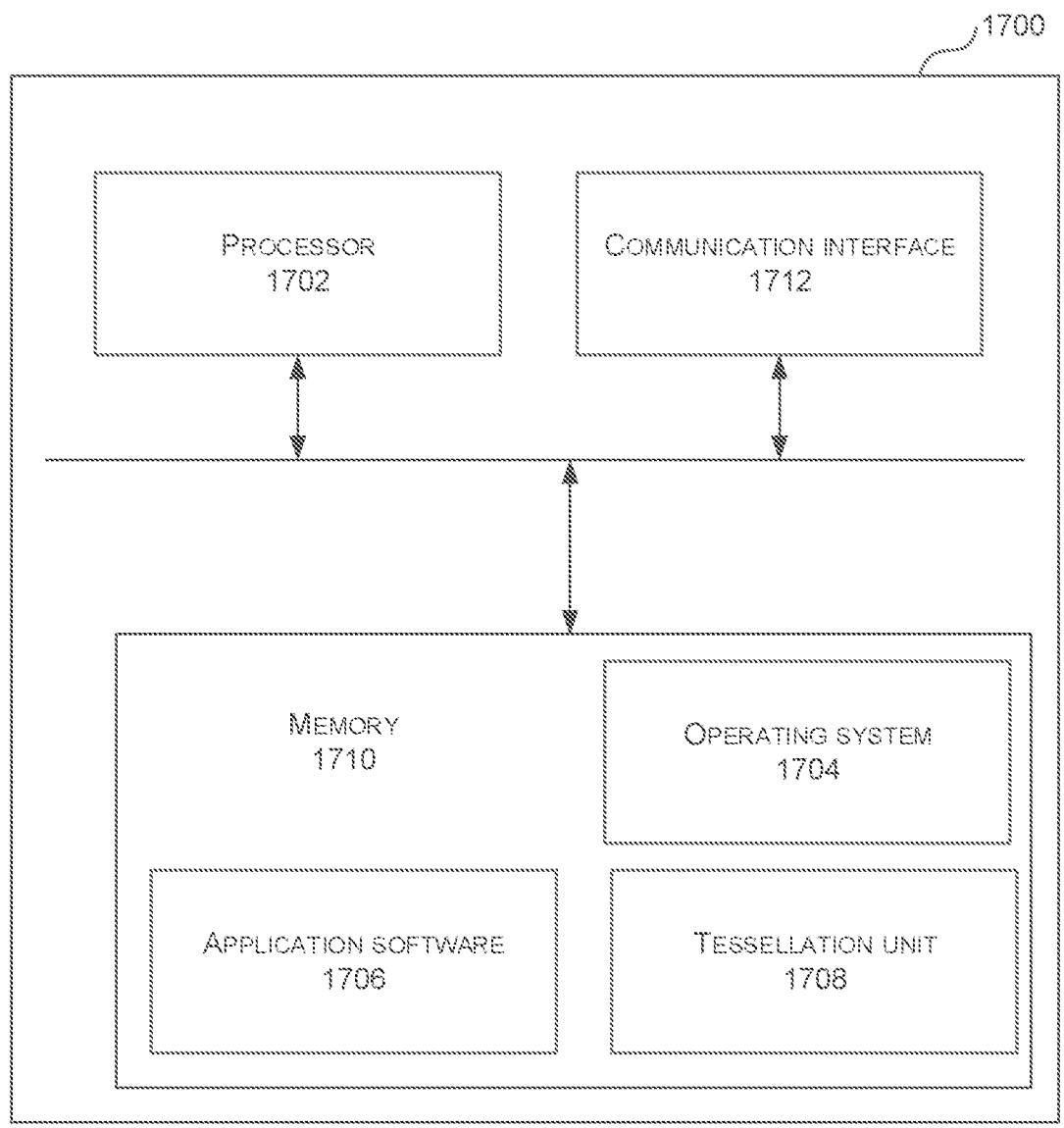
FIG. 17 is a schematic diagram of a computing-based device configured to implement the ordering methods described herein.

The methods described herein may be implemented in a tessellation unit 104 as shown in FIG. 1 and this tessellation unit may be implemented in hardware. Alternatively, the methods described herein may be implemented in software or a combination of software and hardware. FIG. 17 illustrates various components of an exemplary computing-based device 1700 which may be implemented as any form of a computing and/or electronic device, and which may be configured to implement the methods described above.

Computing-based device 1700 comprises one or more processors 1702 which may be microprocessors, controllers or any other suitable type of processors for processing computer executable instructions to control the operation of the device in order to perform the primitive and optionally vertex ordering methods described herein. In some examples, for example where a system on a chip architecture is used, the processors 1702 may include one or more fixed function blocks (also referred to as accelerators) which implement a part of an ordering method in hardware (rather than software or firmware). Platform software comprising an operating system 1704 or any other suitable platform software may be provided at the computing-based device to enable application software 1706 to be executed on the device and the application software may include a tessellation unit 1708, which may be equivalent in terms of functionality to the tessellation unit 104, that is configured to implement one or more of the methods described herein.

The computer executable instructions may be provided using any computer-readable media that is accessible by computing based device 1700. Computer-readable media may include, for example, computer storage media such as memory 1710 and communications media. Computer storage media (i.e. non-transitory machine readable media), such as memory 1710, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Although the computer storage media (i.e. non-transitory machine readable media, e.g. memory 1710) is shown within the computing-based device 1700 it will be appreciated that the storage may be distributed or located remotely and accessed via a network or other communication link (e.g. using communication interface 1712).

The computing-based device 1700 may also comprise an input/output controller arranged to output display information to a display device which may be separate from or integral to the computing-based device 1700. The display information may provide a graphical user interface. The input/output controller may also be arranged to receive and process input from one or more devices, such as a user input device (e.g. a mouse or a keyboard). In an embodiment the display device may also act as the user input device if it is a touch sensitive display device. The input/output controller may also output data to devices other than the display device, e.g. a locally connected printing device.

Figure 18:
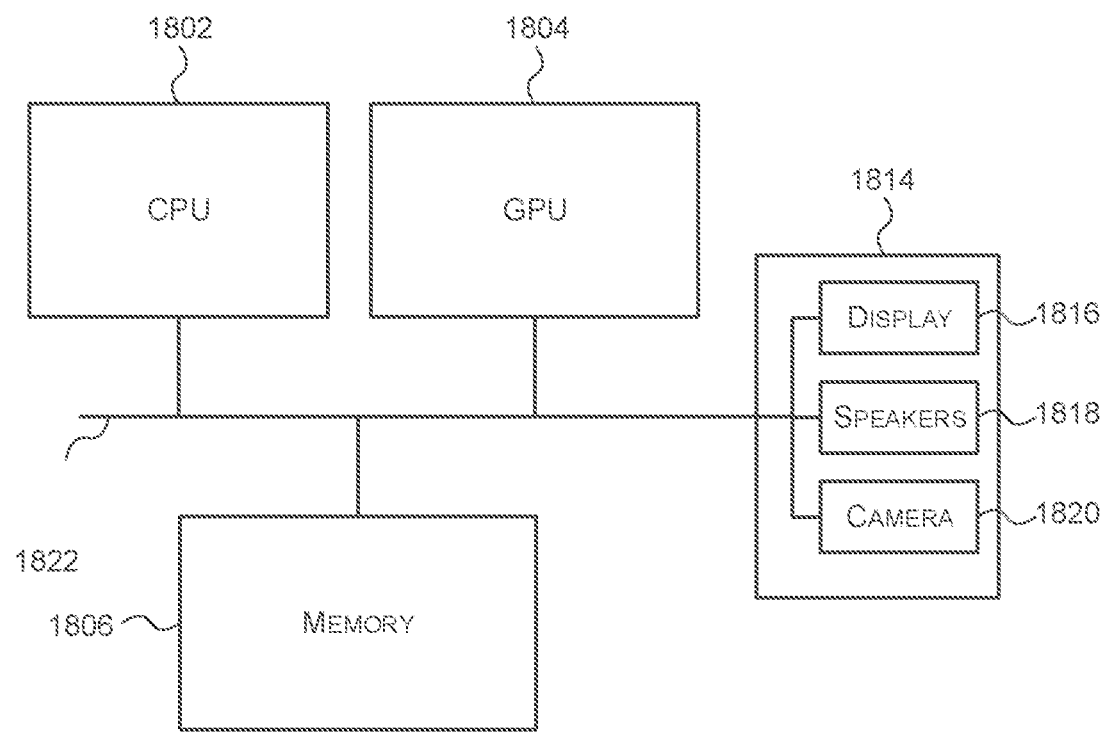
FIG. 18 shows a computer system in which a tessellation unit configured to perform an ordering method as described herein is implemented.

FIG. 18 shows a computer system in which the GPU pipeline 100 (including the tessellator unit 104) described above may be implemented. The computer system comprises a CPU 1802, a GPU 1804, a memory 1806 and other devices 1814, such as a display 1816, speakers 1818 and a camera 1820. The GPU pipeline 100 forms part of the GPU 1804. The components of the computer system can communicate with each other via a communications bus 1822.

The tessellator unit 104 (or other hardware configured to perform an ordering method as described herein) may be embodied in hardware on an integrated circuit. The tessellator unit 104 described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java® or OpenCL®. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, System-on-chip, state machine, media processor, an application-specific integrated circuit (ASIC), a programmable logic array, a field-programmable gate array (FPGA), physics processing units (PPUs), radio processing units (RPUs), digital signal processors (DSPs), general purpose processors (e.g. a general purpose GPU), microprocessors, any processing unit which is designed to accelerate tasks outside of a CPU, etc. A computer or computer system may comprise one or more processors. Those skilled in the art will realize that such processing capabilities are incorporated into many different devices and therefore the term 'computer' includes set top boxes, media players, digital radios, PCs, servers, mobile telephones, personal digital assistants and many other devices.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed in an integrated circuit manufacturing system configures the system to manufacture a tessellation unit configured to perform any of the methods described herein, or to manufacture a tessellation unit comprising any apparatus described herein. An integrated circuit definition dataset may be, for example, an integrated circuit description.

An integrated circuit definition dataset may be in the form of computer code, for example as a netlist, code for configuring a programmable chip, as a hardware description language defining an integrated circuit at any level, including as register transfer level (RTL) code, as high-level circuit representations such as Verilog or VHDL, and as low-level circuit representations such as OASIS® and GDSII. Higher level representations which logically define an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a tessellation unit will now be described with respect to FIG. 19.

Figure 19:
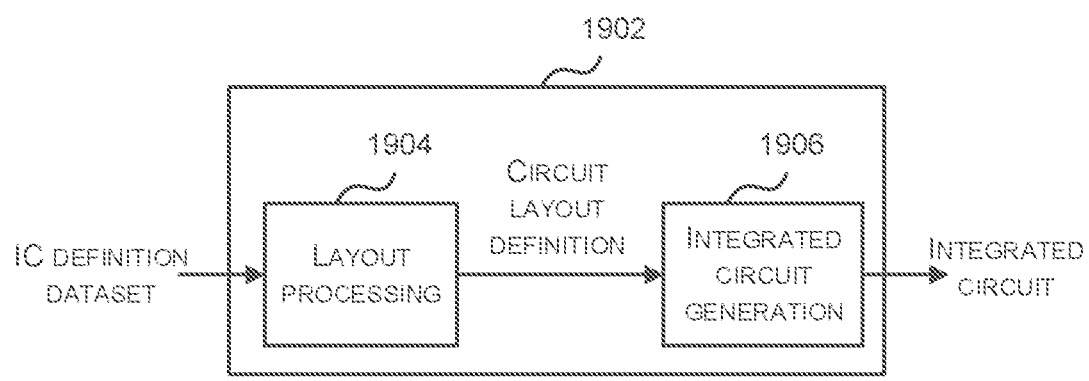
FIG. 19 shows an integrated circuit manufacturing system for generating an integrated circuit embodying a tessellation unit configured to perform an ordering method as described herein.

FIG. 19 shows an example of an integrated circuit (IC) manufacturing system 1902 which comprises a layout processing system 1904 and an integrated circuit generation system 1906. The IC manufacturing system 1902 is configured to receive an IC definition dataset (e.g. defining a tessellation unit configured to implement an ordering method as described herein), process the IC definition dataset, and generate an IC according to the IC definition dataset (e.g. which embodies a tessellation unit configured to implement an ordering method as described herein). The processing of the IC definition dataset configures the IC manufacturing system 1902 to manufacture an integrated circuit embodying a tessellation unit configured to implement an ordering method as described herein.

The layout processing system 1904 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 1904 has determined the circuit layout it may output a circuit layout definition to the IC generation system 1906. A circuit layout definition may be, for example, a circuit layout description.

The IC generation system 1906 generates an IC according to the circuit layout definition, as is known in the art. For example, the IC generation system 1006 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 1906 may be in the form of computer-readable code which the IC generation system 1906 can use to form a suitable mask for use in generating an IC.

The different processes performed by the IC manufacturing system 1902 may be implemented all in one location, e.g. by one party. Alternatively, the IC manufacturing system 1902 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a tessellation unit configured to implement an ordering method as described herein without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 19 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 19, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

The methods described herein may be performed by a computer configured with software in machine readable form stored on a tangible storage medium e.g. in the form of a computer program comprising computer readable program code for configuring a computer to perform the constituent portions of described methods or in the form of a computer program comprising computer program code means adapted to perform all the steps of any of the methods described herein when the program is run on a computer and where the computer program may be embodied on a computer readable storage medium. Examples of tangible (or non-transitory) storage media include disks, thumb drives, memory cards etc. and do not include propagated signals. The software can be suitable for execution on a parallel processor or a serial processor such that the method steps may be carried out in any suitable order, or simultaneously.

The hardware components described herein may be generated by a non-transitory computer readable storage medium having encoded thereon computer readable program code.

Memories storing machine executable data for use in implementing disclosed aspects can be non-transitory media. Non-transitory media can be volatile or non-volatile. Examples of volatile non-transitory media include semiconductor-based memory, such as SRAM or DRAM. Examples of technologies that can be used to implement non-volatile memory include optical and magnetic memory technologies, flash memory, phase change memory, resistive RAM.

A particular reference to "logic" refers to structure that performs a function or functions. An example of logic includes circuitry that is arranged to perform those function(s). For example, such circuitry may include transistors and/or other hardware elements available in a manufacturing process. Such transistors and/or other elements may be used to form circuitry or structures that implement and/or contain memory, such as registers, flip flops, or latches, logical operators, such as Boolean operations, mathematical operators, such as adders, multipliers, or shifters, and interconnect, by way of example. Such elements may be provided as custom circuits or standard cell libraries, macros, or at other levels of abstraction. Such elements may be interconnected in a specific arrangement. Logic may include circuitry that is fixed function and circuitry can be programmed to perform a function or functions; such programming may be provided from a firmware or software update or control mechanism. Logic identified to perform one function may also include logic that implements a constituent function or sub-process. In an example, hardware logic has circuitry that implements a fixed function operation, or operations, state machine or process.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages.

Any reference to 'an' item refers to one or more of those items. The term 'comprising' is used herein to mean including the method blocks or elements identified, but that such blocks or elements do not comprise an exclusive list and an apparatus may contain additional blocks or elements and a method may contain additional operations or elements. Furthermore, the blocks, elements and operations are themselves not impliedly closed.

The steps of the methods described herein may be carried out in any suitable order, or simultaneously where appropriate. The arrows between boxes in the figures show one example sequence of method steps but are not intended to exclude other sequences or the performance of multiple steps in parallel. Additionally, individual blocks may be deleted from any of the methods without departing from the spirit and scope of the subject matter described herein. Aspects of any of the examples described above may be combined with aspects of any of the other examples described to form further examples without losing the effect sought. Where elements of the figures are shown connected by arrows, it will be appreciated that these arrows show just one example flow of communications (including data and control messages) between elements. The flow between elements may be in either direction or in both directions.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

What is claimed is:

1. A method of performing tessellation in a computer graphics system, the method comprising:
    dividing an initial patch into two or more sub-patches; and
    selecting and tessellating each sub-patch in an order encoded by one or more stored values.

2. The method according to claim 1, wherein the one or more stored values comprise values of one or more flags.

3. The method according to claim 1, wherein dividing an initial patch into two or more sub-patches is in response to determining that an initial patch is to be sub divided, and wherein selecting and tessellating each sub-patch comprises selecting and tessellating each sub-patch until there is no further sub-division of that sub-patch in an order encoded by one or more stored values and selecting and tessellating each sub-patch further comprises:

selecting one of the sub-patches formed by sub-division of the initial patch based on one or more stored values;

tessellating the selected sub-patch until there is no further sub-division; and repeating the selecting and tessellating until all the sub-patches formed by sub-division of the initial patch have been tessellated until there is no further sub-division of those sub-patches.

4. The method according to claim 3, wherein the initial patch is sub-divided into a left sub-patch and a right sub-patch;

selecting one of the sub-patches formed by sub-division of the initial patch based on one or more stored values comprises: selecting one of the left and right sub-patches formed by sub-division of the initial patch based on one or more stored values; and repeating the selecting and tessellating until all the sub-patches formed by sub-division of the initial patch have been tessellated until there is no further sub-division of those sub-patches comprises: subsequently tessellating the other of the left and right sub-patches formed by sub-division of the initial patch until there is no further sub-division.

5. The method according to claim 4, wherein tessellating the selected sub-patch until there is no further sub-division comprises:

analysing the selected sub-patch to determine whether to sub-divide the selected sub-patch;

in response to determining that the selected sub-patch is to be sub-divided, dividing the selected sub-patch into a left sub-patch and a right sub-patch;

selecting one of the left and right sub-patches formed by sub-division of the selected sub-patch based on one or more stored values;

first, tessellating the selected sub-patch until there is no further sub-division; and then, tessellating the non-selected sub-patch until there is no further sub-division; and wherein tessellating the non-selected sub-patch until there is no further sub-division comprises:

analysing the non-selected sub-patch to determine whether to sub-divide the non-selected sub-patch;

in response to determining that the non-selected sub-patch is to be sub-divided, dividing the non-selected sub-patch into a left sub-patch and a right sub-patch;

selecting one of the left and right sub-patches formed by sub-division of the non-selected sub-patch based on one or more stored values;

first, tessellating the selected sub-patch until there is no further sub-division; and then, tessellating the non-selected sub-patch until there is no further sub-division.

6. The method according to claim 1, wherein the one or more stored values comprise one or more flags, wherein the initial patch has one or more ordering flags and selecting one of the patches formed by sub-division of the initial patch based on one or more stored values comprises:

selecting one of the patches formed by sub-division of the initial patch based on values of the one or more ordering flags of the initial patch.

7. The method according to claim 6, wherein dividing the initial patch into two or more sub-patches comprises:

dividing the initial patch into two or more sub-patches; and setting one or more ordering flags for each of the sub-patches formed from the initial patch, wherein the one or more ordering flags for each of the sub-patches formed from the initial patch are derived from the one or more ordering flags of the initial patch.

8. The method according to claim 7, wherein each initial patch and each sub-patch has a single ordering flag and the ordering flag for each sub-patch formed from the initial patch has an opposite value to the ordering flag of the initial patch.

9. The method according to claim 1, wherein the one or more stored values comprise one or more flags, wherein selecting one of the patches formed by sub-division of the initial patch based on one or more stored values comprises:

selecting one of the sub-patches formed by sub-division of the initial patch based on a value of an ordering flag.

10. The method according to claim 9, further comprising:

inverting the value of the ordering flag once for each increase or decrease in a level of sub-division.

11. The method according to claim 1, wherein dividing the initial patch or a sub-patch into two or more sub-patches comprises:

adding a new vertex;

the method further comprising, in response to determining that the initial patch or a sub-patch is to be sub-divided:

pushing the new vertex onto a data structure operating a first in, last out scheme; and in response to determining that the initial patch or sub-patch is not to be sub-divided, popping a vertex from the data structure and outputting the vertex if it has not previously been output.

12. The method according to claim 11, further comprising, in response to determining that the initial patch or sub-patch is not to be sub-divided, delaying output of the initial patch or sub-patch, as a primitive, until all vertices of the initial patch or sub-patch have been output.

13. The method according to claim 12, wherein delaying output of the initial patch or sub-patch until all vertices of the initial patch or sub-patch have been output comprises:

adding the initial patch or sub-patch to a queue;

determining whether all vertices of the initial patch or sub-patch have been output; and in response to determining that all the vertices of the initial patch or sub-patch have been output, outputting the initial patch or sub-patch as a primitive.

14. The method according to claim 13, wherein delaying output of the initial patch or sub-patch until all vertices of the initial patch or sub-patch have been output comprises:

determining whether all vertices of the initial patch or sub-patch have been output; and in response to determining that all the vertices of the initial patch or sub-patch have not been output, adding the initial patch or sub-patch to a queue.

15. The method according to claim 11, further comprising, prior to adding a first new vertex to the data structure:

outputting the middle vertex of a polygonal domain and a first corner vertex of the polygonal domain; and initializing the data structure by pushing vertices corresponding to the other corners of the polygonal domain in either a clockwise or counter-clockwise order into the stack.

16. A method of performing tessellation in a computer graphics system, comprising:

dividing an initial patch into two or more sub-patches; and selecting and tessellating each sub-patch in an order encoded by one or more stored values, and wherein the order for selection is alternated for each increase or decrease in level of sub-division.

17. A non-transitory computer readable storage medium having stored thereon computer readable code configured to perform the method of claim 1 when the code is run on a computer.

18. A tessellation unit configured to perform tessellation in a graphics processing pipeline, wherein the tessellation unit comprises hardware logic arranged to:
   divide an input patch into two or more sub-patches; and
   select and tessellate each sub-patch in an order encoded by one or more stored values.

19. The tessellation unit according to claim 18, wherein the order for selection is alternated for each increase or decrease in level of sub-division.

20. An integrated circuit manufacturing system comprising:
   a non-transitory computer readable storage medium having stored thereon a computer readable dataset description of an integrated circuit that describes a graphics processing system comprising a tessellation unit as set forth in claim 18;
   a layout processing system configured to process the integrated circuit description so as to generate a circuit layout description of an integrated circuit embodying the graphics processing system; and
   an integrated circuit generation system configured to manufacture the graphics processing system according to the circuit layout description.

* * * * *